(12) United States Patent
Plotnikov

(10) Patent No.: US 10,223,113 B2
(45) Date of Patent: *Mar. 5, 2019

(54) PROCESSORS, METHODS, SYSTEMS, AND INSTRUCTIONS TO STORE CONSECUTIVE SOURCE ELEMENTS TO UNMASKED RESULT ELEMENTS WITH PROPAGATION TO MASKED RESULT ELEMENTS

(71) Applicant: Intel Corporation, Santa Clara, CA (US)

(72) Inventor: Mikhail Plotnikov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/122,005

(22) PCT Filed: Mar. 27, 2014

(86) PCT No.: PCT/IB2014/000611
§ 371 (c)(1),
(2) Date: Aug. 26, 2016

(87) PCT Pub. No.: WO2015/145190
PCT Pub. Date: Oct. 1, 2015

(65) Prior Publication Data
US 2017/0017488 A1    Jan. 19, 2017

(51) Int. Cl.
*G06F 9/30* (2018.01)

(52) U.S. Cl.
CPC ........ *G06F 9/30018* (2013.01); *G06F 9/3016* (2013.01); *G06F 9/30032* (2013.01); *G06F 9/30036* (2013.01)

(58) Field of Classification Search
None
See application file for complete search history.

(56) References Cited

U.S. PATENT DOCUMENTS

| 4,180,861 A | 12/1979 | Armstrong et al. |
| 6,356,951 B1 | 3/2002 | Gentry, Jr. |

(Continued)

FOREIGN PATENT DOCUMENTS

| CN | 102473093 A | 5/2012 |
| CN | 103562855 A | 2/2014 |

(Continued)

OTHER PUBLICATIONS

Office Action received for Korean Patent Application No. 10-2016-7023187, dated Mar. 31, 2017, 4 pages of Korean Office Action only.

(Continued)

*Primary Examiner* — Corey S Faherty
(74) *Attorney, Agent, or Firm* — NDWE, LLP

(57) ABSTRACT

A processor of an aspect includes a decode unit to decode an instruction indicating a first source packed data operand including at least four data elements, a source mask including at least four mask elements, and a destination storage location. An execution unit, in response to the instruction, stores a result packed data operand having a series of at least two unmasked result data elements. Each of the unmasked result data elements stores a value of a different one of at least two consecutive data elements of the first source packed data operand in a relative order. All masked result elements, which are between a nearest corresponding pair of unmasked result data elements, have a same value as an unmasked result data element of the corresponding pair, which is closest to a first end of the result packed data operand. The masked result data elements correspond to masked mask elements.

25 Claims, 21 Drawing Sheets

(56) References Cited

U.S. PATENT DOCUMENTS

| | | | |
|---|---|---|---|
| 6,502,115 | B2 | 12/2002 | Abdallah et al. |
| 9,501,276 | B2* | 11/2016 | Uliel .................. G06F 9/30018 |
| 9,798,541 | B2* | 10/2017 | Bharadwaj .......... G06F 9/30018 |
| 2010/0042789 | A1 | 2/2010 | Gonion et al. |
| 2010/0042807 | A1 | 2/2010 | Gonion et al. |
| 2010/0042815 | A1 | 2/2010 | Gonion et al. |
| 2010/0042816 | A1 | 2/2010 | Gonion et al. |
| 2010/0042817 | A1 | 2/2010 | Gonion et al. |
| 2010/0042818 | A1 | 2/2010 | Gonion et al. |
| 2010/0049950 | A1 | 2/2010 | Gonion et al. |
| 2010/0049951 | A1 | 2/2010 | Gonion et al. |
| 2010/0058037 | A1 | 3/2010 | Gonion et al. |
| 2010/0325398 | A1 | 12/2010 | Gonion et al. |
| 2010/0325399 | A1 | 12/2010 | Gonion et al. |
| 2010/0325483 | A1 | 12/2010 | Gonion et al. |
| 2011/0035567 | A1 | 2/2011 | Gonion et al. |
| 2011/0035568 | A1 | 2/2011 | Gonion et al. |
| 2011/0093681 | A1 | 4/2011 | Gonion et al. |
| 2011/0113217 | A1 | 5/2011 | Gonion et al. |
| 2011/0276782 | A1 | 11/2011 | Gonion et al. |
| 2011/0283092 | A1 | 11/2011 | Gonion |
| 2012/0060020 | A1 | 3/2012 | Gonion et al. |
| 2012/0254592 | A1 | 10/2012 | San Adrian et al. |
| 2014/0189321 | A1* | 7/2014 | Uliel .................. G06F 9/30018 712/222 |
| 2014/0189323 | A1* | 7/2014 | Bharadwaj .......... G06F 9/30018 712/224 |
| 2014/0289502 | A1* | 9/2014 | Gonion ............... G06F 9/30036 712/222 |
| 2017/0017487 | A1 | 1/2017 | Plotnikov |

FOREIGN PATENT DOCUMENTS

| | | | |
|---|---|---|---|
| JP | 2013175201 | A | 9/2013 |
| JP | 2013254484 | A | 12/2013 |
| JP | 2017513087 | A | 5/2017 |
| KR | 10-2012-0026104 | A | 3/2012 |
| KR | 10-2013-0137698 | A | 12/2013 |
| KR | 10-2013-0140160 | A | 12/2013 |
| TW | 201344570 | A | 11/2013 |
| WO | 2013/095617 | A1 | 6/2013 |
| WO | 2015/145190 | A1 | 10/2015 |
| WO | 2015/145193 | A1 | 10/2015 |

OTHER PUBLICATIONS

Notice of Allowance received for Korean Patent Application No. 10-2016-7023187, dated Oct. 31, 2017, 3 pages of Korean Notice of Allowance including 1 page of English Translation.

Office Action received for Korean Patent Application No. 10-2016-7023187, dated Mar. 31, 2017, 6 pages of Korean Office Action including 2 pages of English Translation.

Response for Korean Patent Application No. 10-2016-7023187 filed on May 30, 2017 to Office Action dated Mar. 31, 2017, 12 pages of Official copy only.

Office Action received for Japanese Patent Application No. 2016-550582, dated Dec. 5, 2017, 5 pages of Japanese Office Action including 3 pages of English Translation.

Office Action received for Chinese Patent Application No. 201480076431.4, dated Dec. 26, 2017, 8 pages of Chinese Office Action only.

Intel, "Intel 64 and IA-32 Architectures Software Developer's Manual", vol. 1: Basic Architecture, Order No. 253665-040US, Oct. 2011, 548 pages.

Intel, "Intel 64 and IA-32 Architectures Software Developer's Manual", vol. 2 (2A, 2B & 2C): Instruction Set Reference, A-Z, Order No. 325383-040US, Oct. 2011, 1721 pages.

Intel, "Intel 64 and IA-32 Architectures Software Developer's Manual", vol. 3 (3A, 3B & 3C): System Programming Guide, Order No. 325384-040US, Oct. 2011, 1916 pages.

Intel, "Intel Advanced Vector Extensions Programming Reference", Jun. 2011, 595 pages.

International Preliminary Report on Patentability and Written Opinion received for application No. PCT/IB2014/000611, dated Oct. 6, 2016, 8 pages.

International Search Report and Written Opinion received for PCT Patent Application No. PCT/IB2014/000611, dated Dec. 19, 2014, 10 pages.

Communication pursuant to Article 94(3) EPC for Application No. 14729717.0, dated Feb. 26, 2018, 7 pages.

Communication pursuant to Rule 71(3) EPC for Application No. 14727896.4, dated Feb. 26, 2018, 7 pages.

Decision to Grant a patent from foreign counterpart Japanese Patent Application No. 2016-550582, dated May 22, 2018, 5 pages.

First Office Action and Search Report from foreign counterpart Chinese Patent Application No. 201480076434.8, dated Dec. 26, 2017, 28 pages.

Intel, "Intel 64 and IA-32 Architectures Software Developer's Manual," Oct. 2011, 526 pages.

International Preliminary Report on Patentability for Application No. PCT/IB2014/000624, dated Oct. 13, 2016, 8 pages.

International Search Report and Written Opinion for Application No. PCT/IB2014/000624, dated Jan. 20, 2015, 10 pages.

Non-Final Office Action from U.S. Appl. No. 15/122,012, dated May 4, 2018, 20 pages.

Notice of Allowance from foreign counterpart Korean Patent Application No. 10-2016-7023676, dated Sep. 29, 2017, 3 pages.

Office Action from foreign counterpart Japanese Patent Application No. 2016-552998, dated Dec. 5, 2017, 22 pages.

Office Action from foreign counterpart Korean Patent Application No. 10-2016-7023676, dated Feb. 28, 2017, 6 pages.

Office Action received for Chinese Patent Application No. 201480076431.4, dated Dec. 26, 2017, 22 pages of Chinese Office Action including 14 pages of English Translation.

Notice of Allowance from U.S. Appl. No. 15/122,012, dated Oct. 11, 2018, 11 pages.

* cited by examiner

NUMBER OF MASK BITS
890

| DATA ELEMENT WIDTH | PACKED DATA WIDTH | | |
|---|---|---|---|
| | 128 BITS | 256 BITS | 512 BITS |
| 8-BIT BYTES | 16 | 32 | 64 |
| 16-BIT WORDS | 8 | 16 | 32 |
| 32-BIT DWORDS/DP | 4 | 8 | 16 |
| 64-BIT DWORDS/DP | 2 | 4 | 8 |

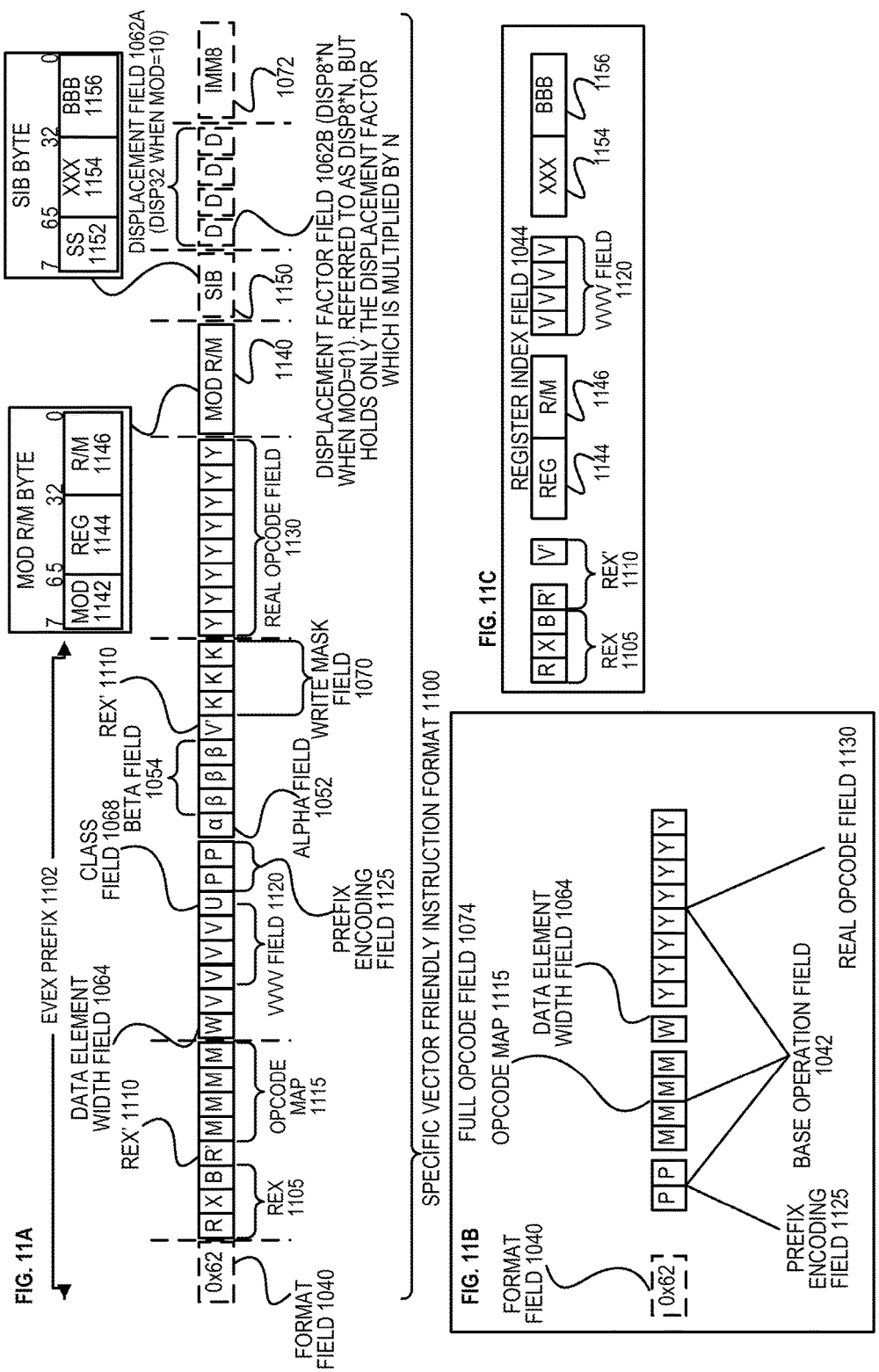

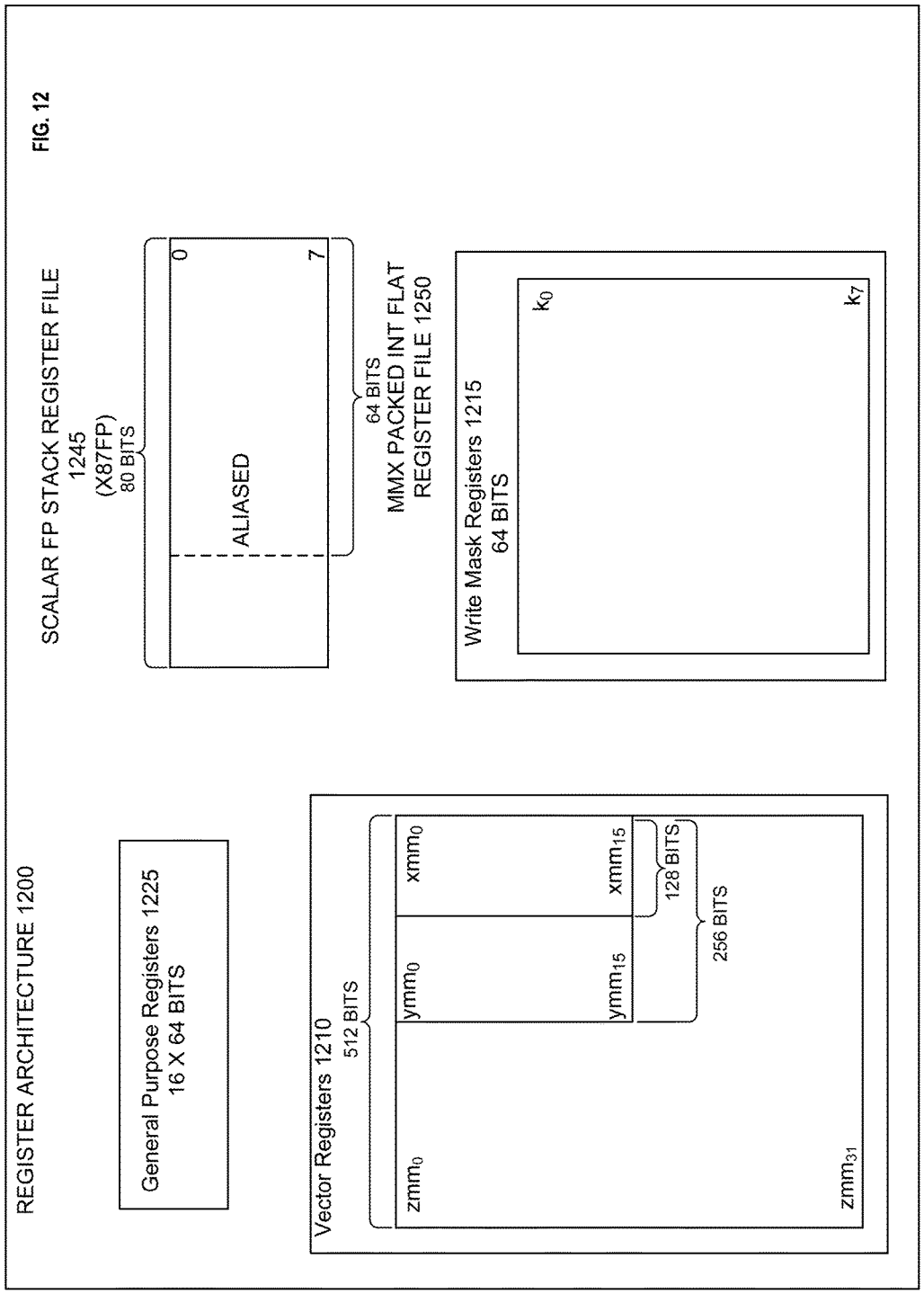

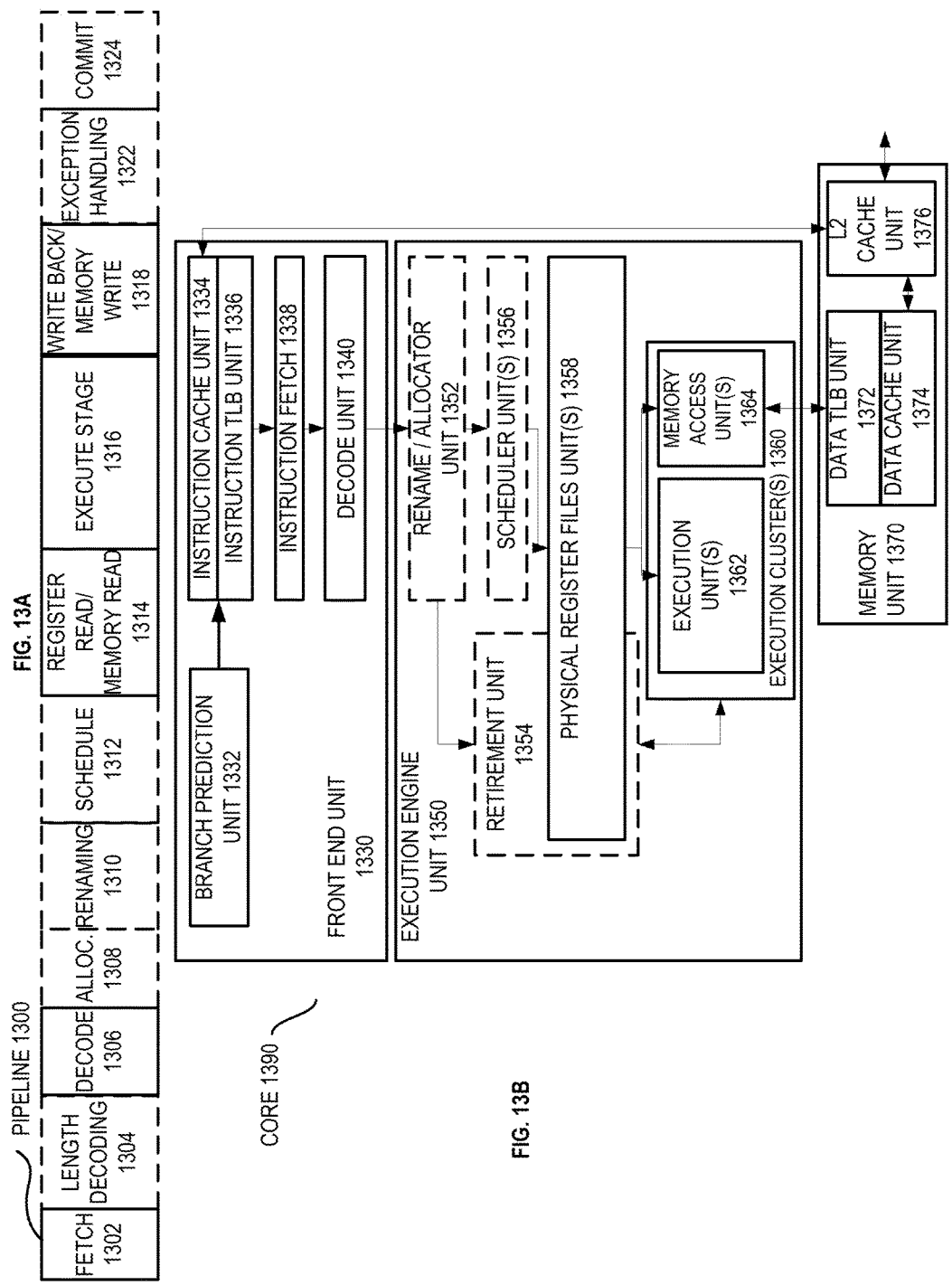

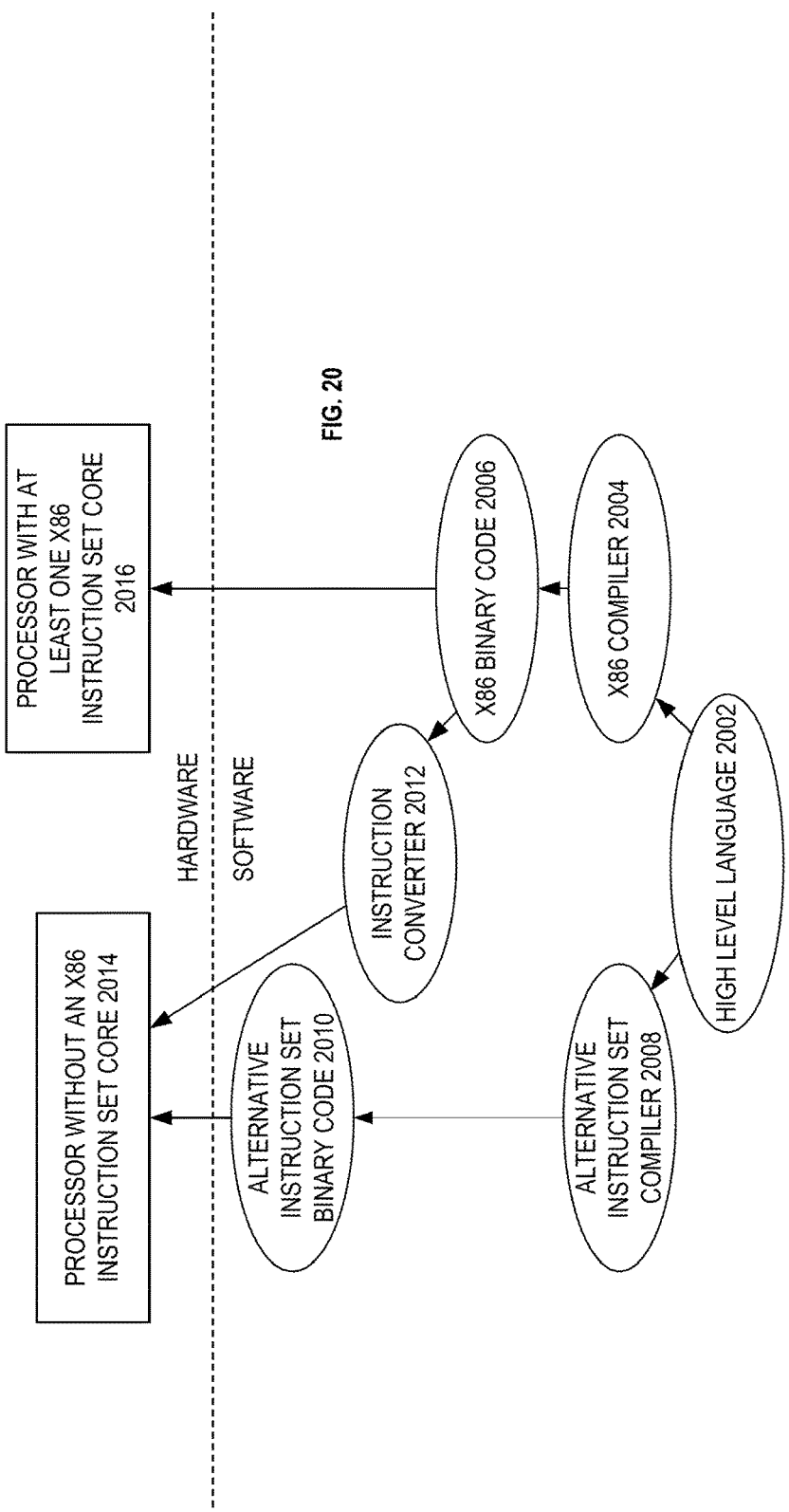

PROCESSORS, METHODS, SYSTEMS, AND INSTRUCTIONS TO STORE CONSECUTIVE SOURCE ELEMENTS TO UNMASKED RESULT ELEMENTS WITH PROPAGATION TO MASKED RESULT ELEMENTS

CROSS-REFERENCE TO RELATED APPLICATION

This patent application is a U.S. National Phase Application under 35 U.S.C. Section 371 of International Application No. PCT/IB2014/000611, filed on Mar. 27, 2014, titled "PROCESSORS, METHODS, SYSTEMS, AND INSTRUCTIONS TO STORE CONSECUTIVE SOURCE ELEMENTS TO UNMASKED RESULT ELEMENTS WITH PROPAGATION".

BACKGROUND

Technical Field

Embodiments described herein generally relate to processors. In particular, embodiments described herein generally relate to processors to perform instructions to operate on packed data.

Background Information

Many processors have Single instruction. Multiple Data (SIMD) architectures. In SIMD architectures, multiple data elements may be packed within one register or memory location as packed data or vector data. In packed data, the bits of the register or other storage location may be logically divided into a sequence of data elements. For example, a 128-bit wide packed data register may have two 64-bit wide data elements, four 32-bit data elements, eight 16-bit data elements, etc. Each of the data elements may represent a separate individual piece of data (e.g., a pixel color, etc.), which may be operated upon separately and/or independently of the others.

BRIEF DESCRIPTION OF THE DRAWINGS

The Invention may best be understood by referring to the following description and accompanying drawings that are used to illustrate embodiments. In the drawings:

FIG. 11A is a block diagram illustrating an exemplary specific vector friendly instruction format, according to embodiments of the invention.

FIG. 11B is a block diagram illustrating fields of a specific vector friendly instruction format that make up a full opcode Held, according to one embodiment of the invention.

FIG. 11C is a block diagram illustrating fields of a specific vector friendly instruction format that make up a register index field, according to one embodiment of the invention.

FIG. 12 is a block diagram of an embodiment of a register architecture.

FIG. 13A is a block diagram illustrating an embodiment of an in-order pipeline and an embodiment of a register renaming out-of-order issue/execution pipeline.

FIG. 13B is a block diagram of an embodiment of processor core including a front end unit coupled to an execution engine unit and both coupled to a memory unit.

FIG. 20 is a block diagram of use of a software instruction converter to convert binary instructions in a source instruction set to binary instructions in a target instruction set, according to embodiments of the invention.

DETAILED DESCRIPTION OF EMBODIMENTS

Disclosed herein arc masked consecutive source element store with propagation instructions to cause a processor to store consecutive source elements to unmasked result elements with propagation to masked result elements, processors to execute the instructions, methods performed by the processors when processing or executing the instructions, and systems incorporating one or more processors to process or execute the instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
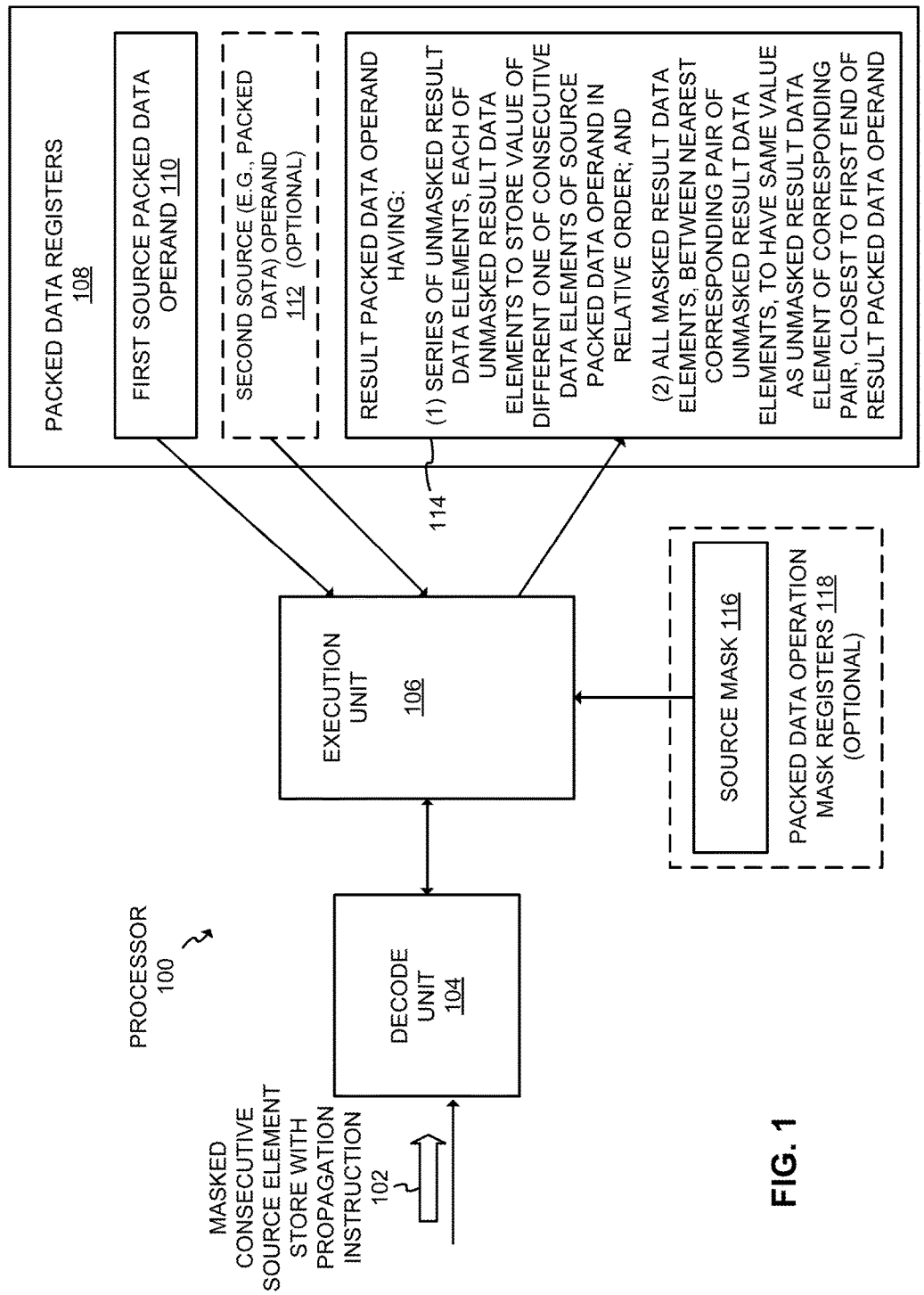
FIG. 1 is a block diagram of on embodiment of a processor that is operable to perform an embodiment of a masked consecutive source element store with propagation instruction.

FIG. 1 is a block diagram of an embodiment of a processor 100 that is operable to perform an embodiment of a masked consecutive source element store with propagation instruction 102. In some embodiments, the processor may be a general-purpose processor (e.g., of the type often used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples. The processor may be any of various complex instruction set computing (CISC) processors, various reduced instruction set computing (RISC) processors, various very long instruction word (VLIW) processors, various hybrids thereof, or may implement a combination of such instruction sets (e.g., in different cores).

During operation, the processor 100 may receive the embodiment of the masked consecutive source element store with propagation instruction 102. For example, the instruction may be received from an instruction fetch unit, an instruction queue, or the like. The instruction may represent a macroinstruction, assembly language instruction, machine code instruction, or other instruction or control signal of an instruction set of the processor. In some embodiments, the instruction may explicitly specify (e.g., through one or more fields or a set of bits), or otherwise indicate (e.g., implicitly indicate), a first source packed data operand 110 having a plurality of (e.g., at least four) data elements, may specify or otherwise indicate a source mask 116 (e.g., in a packed data operation mask register 118) that is to include a plurality of (e.g., at least four) mask elements, and may specify or otherwise indicate a destination storage location where a result packed data operand 114 may be stored. In some embodiments, the instruction may also optionally specify or otherwise indicate a second source (e.g., packed data) operand 112 having at least one value (see e.g., FIGS. 4-6) lo be used fur one or more extreme (e.g., highest order or lowest order) masked result data elements, although this is not required.

Referring again to FIG. 1, the processor includes a decode unit or decoder 104. The decode unit may receive and decode the masked consecutive source element store with propagation instruction 102. The decode unit may output one or more microinstructions, micro-operations, microcode entry points, decoded instructions or control signals, or other relatively lower-level instructions or control signals that reflect, represent, and/or arc derived from the instruction 102. The one or more lower-level instructions or control signals may implement the higher-level instruction 102 through one or more lower-level (e.g., circuit-level or hardware-level) operations. The decode unit may be implemented using various different mechanisms including, but not limited lo, microcode read only memories (ROMs), look-up tables, hardware implementations, programmable logic arrays (PLAs), and other mechanisms known in the art.

In some embodiments, instead of the instruction 102 being provided directly to the decode unit, an instruction emulator, translator, morpher, interpreter, or other instruction conversion module may optionally be used. Various different types of instruction conversion modules are known in the arts and may be implemented in software, hardware, firmware, or a combination thereof. In some embodiments, the instruction conversion module may be located outside the instruction processing processor, such as, for example, on a separate die and/or in a memory (e.g., as a static, dynamic, or runtime instruction emulation module). By way of example, the instruction conversion module may receive the instruction 102 which may be of a first instruction set and may emulate, translate, morph, interpret, or otherwise convert the instruction 102 into one or more corresponding or derived intermediate instructions or control signals which may be of a second different instruction set. The one or more intermediate instructions or control signals of the second instruction set may be provided to a decode unit (e.g., decode unit 104), which may decode the received one or more instructions or control signals of the second instruction set into one or more lower-level instructions or control signals executable by native hardware of the processor (e.g., one or more execution units).

The processor also includes a set of packed data registers 108. Each of the packed data registers may represent an on-die storage location that is operable to store packed data, vector data, or SIMD data. The packed data registers may represent architecturally-visible registers (e.g., an architectural register file). The architecturally-visible or architectural registers are visible to software and/or a programmer and/or are the registers indicated by instructions of an instruction set of the processor to identify operands. These architectural registers are contrasted to other non-architectural or non-architecturally visible registers in a given microarchitecture (e.g., temporary registers, reorder buffers, retirement registers, etc). The packet data registers may be implemented in different ways in different microarchitectures using well-known techniques and are not limited to any particular type of circuit. Various different types of registers are suitable. Examples of suitable types of registers include, but are not limited to, dedicated physical registers, dynamically allocated physical registers using register renaming, and combinations thereof.

In some embodiments, the first source packed data operand 110 may optionally be stored in a first packed data register, and the optional second source packed data operand 112 may be stored in a second packed data register. Alternatively, memory locations, or other storage locations, may be used for one or more of these operands. In some embodiments, the destination storage location may also be a packed data register. In some cases, the packed data register used as the destination storage location may be different than the packed data register used for the first source packed data operand and the second source operand. In other cases, the packed data register used for one of the source packed data operands may be reused as the destination storage location (e.g., the result packed data operand 114 may be written over one of the source packed data operands 110 or 112). Alternatively, memory or other storage locations may optionally be used for the destination storage location.

Referring again in FIG. 1, the execution unit 106 is coupled with the decode unit 104, the first source packed data operand 110, the optional second source operand 112 (if it is used), and the source mask 116. For example, the execution unit may be coupled with the packed data registers 108 and the packed data operation mask registers 118. By way of example, the execution unit may include an arithmetic logic unit, a logic unit, a digital circuit to perform logical or dam manipulation operations, or the like. The execution unit may receive the one or more decoded or otherwise converted instructions or control signals that represent and/or are derived from the masked consecutive source element store with propagation instruction 102. The execution unit may also receive the first source packed data operand 110, the source mask 116, and in some embodiments the optional second source operand 112, which may all be specified or otherwise indicated by the instruction 102.

In some embodiments, the execution unit may use the source mask 116 as a mask or control operand to mask or control how data elements are to be stored from the first source packed data operand 110 to the result packed data operand 114. The source mask may include multiple mask elements or control elements. In some embodiments, the mask elements may be included in a one-to-one correspondence with corresponding result data elements of the result packed data operand so that masking or control may be provided for each result data element separately and/or independently of the others. In some embodiments, each mask element may be a single mask bit, although the scope of the invention is not so limited. In such cases, the source mask may have a mask bit for each result data element. In some embodiments, a value of each mask bit or other mask element may mask or control whether or not a next consecutive data element from the first source packed data operand 110 is to be stored to the corresponding result data element in the result packed data operand 114. For example, each mask bit or element may have an unmasked, value (e.g., be set to binary one (i.e., 1)) to cause the next consecutive source data element in the first source packed data operand 110 to be stored to the corresponding unmasked result data element, or each mask bit may have a masked value (e.g., be cleared to binary zero (i.e., 0)) to cause another value (e.g., of a closest unmasked result data element) to be propagated or otherwise stored to the corresponding masked result data element. In another embodiment, two or more bits may optionally be used for each mask element. For example, each mask element may have a same number of bits as each corresponding source data element, and a lowest order bit or a highest order bit may be used as a single mask bit.

The execution unit may be operable in response to and/or as a result of the instruction 102 (e.g., in response to one or more instructions or control signals decoded from the instruction) to store the result packed data operand 114 in the destination storage location indicated by the instruction. In some embodiments, the result packed data operand may include a series of at least two unmasked result data elements. The series of the unmasked result data elements may be between a first end (e.g., a lowest order or least significant end or bit position) and a second end (e.g. a highest order or most significant end or bit position) of the result packed data operand. Each of the unmasked result data elements may correspond to a different corresponding unmasked mask element (e.g., as opposed to a masked mask element) of the source mask 116. Each of the at least two unmasked result data elements of the series may store a value of a different one of at least two consecutive data elements of the first source packed data operand 110 in a same relative order. In some embodiments, the consecutive or contiguous data elements of the first source packed data operand may be expanded to the series of non-contiguous or potentially sparse unmasked data element positions in the result packed data operand corresponding to the unmasked elements of the source mask. The unmasked elements of the source mask may select the corresponding unmasked result data element positions to be replaced by the ascending consecutive data elements of the first source packed data operand. The relative order (e.g., same order or reverse order) of the values in the consecutive source data elements may be maintained in the series of unmasked result data elements. For example, a lowest order unmasked result data element of the series may store a value of a lowest order data element of the at least two consecutive data elements, a next-lowest order unmasked result data element of the series may store a value of a next-lowest order data element of the at least two consecutive data elements, and so on. In some examples, there may be at least three, or more than three of such unmasked result data elements, although this is not required.

In some embodiments, the result packed data operand may also include at least one, or a plurality of, masked result data elements. The masked result data elements may correspond to masked mask elements (e.g., as opposed to unmasked mask elements) of the source mask. In some embodiments, all masked result data elements, which are between a nearest corresponding pair of unmasked result data elements, may have a same value as one of the unmasked result data elements of the corresponding pair. In some embodiments, all masked result data elements between a pair of nearest unmasked result data elements may have a same value as an unmasked result data element of the pair that is closest to the first end (e.g., a lowest order or least significant bit position or end) of the result packed data operand. In some embodiments, the value of the unmasked result data element may be propagated or otherwise stored into all of these adjoining masked result data elements between itself and the next sequential unmasked result data element. Advantageously, it is not required to zero or leave unchanged the masked result data elements. In some embodiments, the result packed data operand may optionally be any of those shown and described for any of FIGS. 3-6, although the scope of the invention is not so limited.

In some embodiments, the aforementioned characteristics of the result packed data operand (e.g., propagating or otherwise storing a value of an unmasked result data element to an adjacent masked data element) may be fixed or implicit to the instruction (e.g., fixed or implicit for an opcode of the instruction and/or a type of the instruction). That is, such characteristics need not be achieved by through explicit specification or control (e.g., by creating a control operand) together with a highly flexible instruction, such as, for example, a full shuffle or permute instruction, whose type or opcode would not fix or imply such characteristics.

Advantageously, in some embodiments, the masked consecutive source element store with propagation instruction may be operative to cause the processor to store consecutive source data elements to a series of unmasked result data elements and propagate or otherwise store the source data elements to adjoining masked result data elements between the unmasked result data elements. The ability to propagate or otherwise store the source data elements to the masked result data elements may be useful and/or advantageous in certain implementations. For example, this may be the case when the instruction is used to implement loops with computations over a scalar value which is incremented under condition. As another example, this may be the case when a value of a variable in to remain the same when conditions are not satisfied, and is only changed to the value of the next consecutive data element, when a next condition is satisfied.

The execution unit and/or the processor may include specific or particular logic (e.g., transistors, integrated circuitry, or other hardware potentially combined with firmware (e.g., instructions stored in non-volatile memory) and/or software) that is operable to perform the instruction 102 and/or store the result in response to and/or as a result of the instruction 102.

To avoid obscuring the description, a relatively simple processor has been shown and described. In other embodiments the processor may optionally include other well-known processor components. Embodiments may be included in processors have multiple cores, logical processors, or execution engines at least one of which has a decode unit and an execution unit to perform an embodiment of an instruction disclosed herein.

Figure 2:
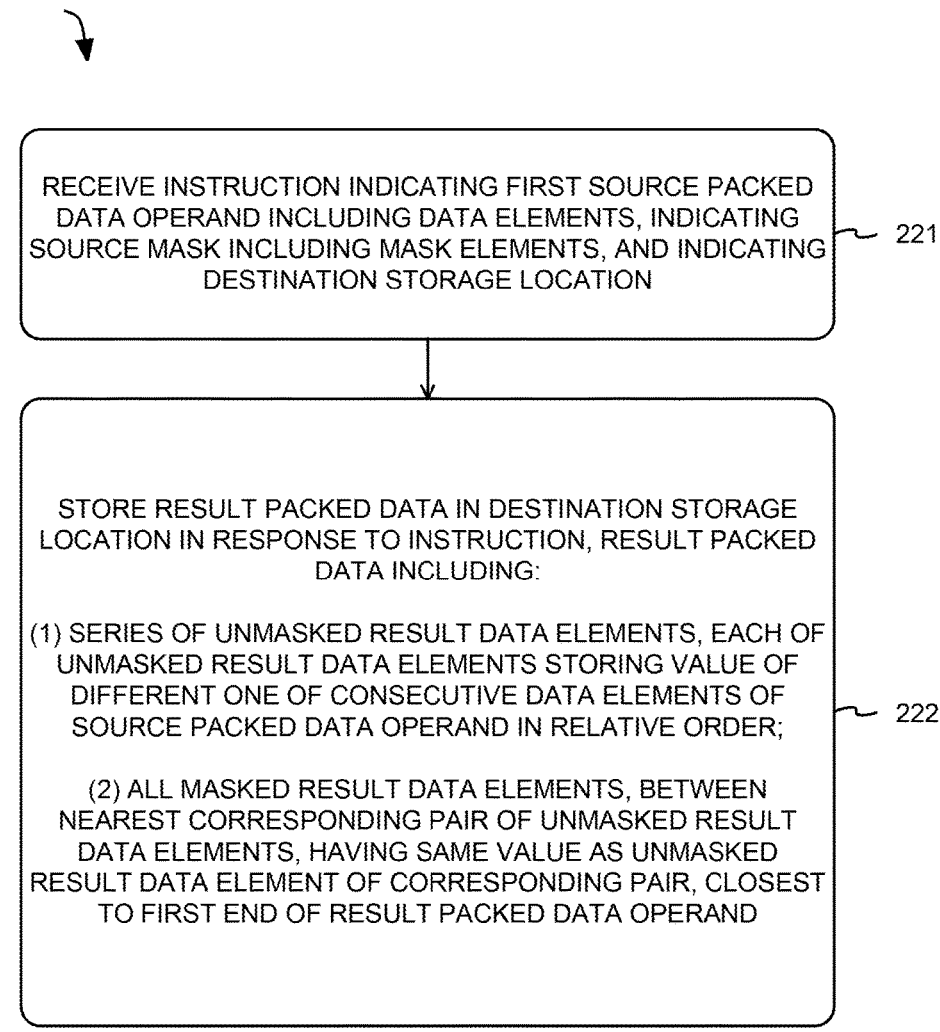
FIG. 2 is a block flow diagram of an embodiment of a method of performing an embodiment of a masked consecutive source element store with propagation instruction.

FIG. 2 is a block flow diagram of an embodiment of a method 220 of performing an embodiment of a masked consecutive source element store with propagation instruction. In various embodiments, the method may be performed by a processor, instruction processing apparatus, or other digital logic apparatus. In some embodiments, the method of FIG. 2 may be performed by and/or within the processor of FIG. 1. The components, features, and specific optional details described herein for the processor of FIG. 1 also optionally apply to the method of FIG. 2. Alternatively, the method of FIG. 2 may be performed by and/or within a similar or different processor or apparatus. Moreover, the processor of FIG. 1 may perform methods the same as, similar to, or different than those of FIG. 2.

The method includes receiving the masked consecutive source element store with propagation instruction, at block 221. In various aspects, the instruction may be received at a processor or a portion thereof (e.g., an instruction fetch unit, a decode unit, a bus interface unit, etc.). In various aspects, the instruction may be received from an off-die source (e.g., from memory, interconnect, etc.), or from an on-die source (e.g., from an instruction cache, instruction queue, etc.). The instruction may specify or otherwise indicate a first source packed data operand including a first plurality of (e.g., at least four) data elements, may specify or otherwise indicate a source mask including a plurality of (e.g., at least four) mask elements, and may specify or otherwise indicate a destination storage location.

The method includes storing a result packed data operand in the destination storage location in response to and/or as a result of the instruction, at block 222. Representatively, an execution unit may perform the instruction and store the result. In some embodiments, the result packed data operand may include a series of at least two unmasked result data elements. Each of the unmasked result data elements may store a value of a different one of at least two consecutive data elements of the first source packed data operand in a relative order (e.g., a same order or a reverse order). In some embodiments, the result packed data operand may also include all masked result data elements, which are between a nearest corresponding pair of unmasked result data elements, which are to have a same value at an unmasked result data element of the corresponding pair, which is closest to a first end of the result packed data operand. The masked result data elements may correspond to masked mask elements of the source mask. In some embodiments, the result packed data operand may have any of the characteristics shown and described for any of FIGS. 3-6, although the scope of the invention is not so limited.

The illustrated method involves architectural operations (e.g., those visible from a software perspective). In other embodiments, the method may optionally include one or more microarchitectural operations. For example, the instruction may be fetched, decoded, scheduled out-of-order, source operands may be accessed, an execution unit may perform microarchitectural operations to implement the instruction, etc. In some embodiments, the microarchitectural operations to implement the instruction may optionally include evaluating a value of a mask bit, multiplexing or otherwise moving or rearranging consecutive source data elements to a series of unmasked result data elements, propagating the source data elements to one or more masked result data elements, etc, etc.

Figure 3:
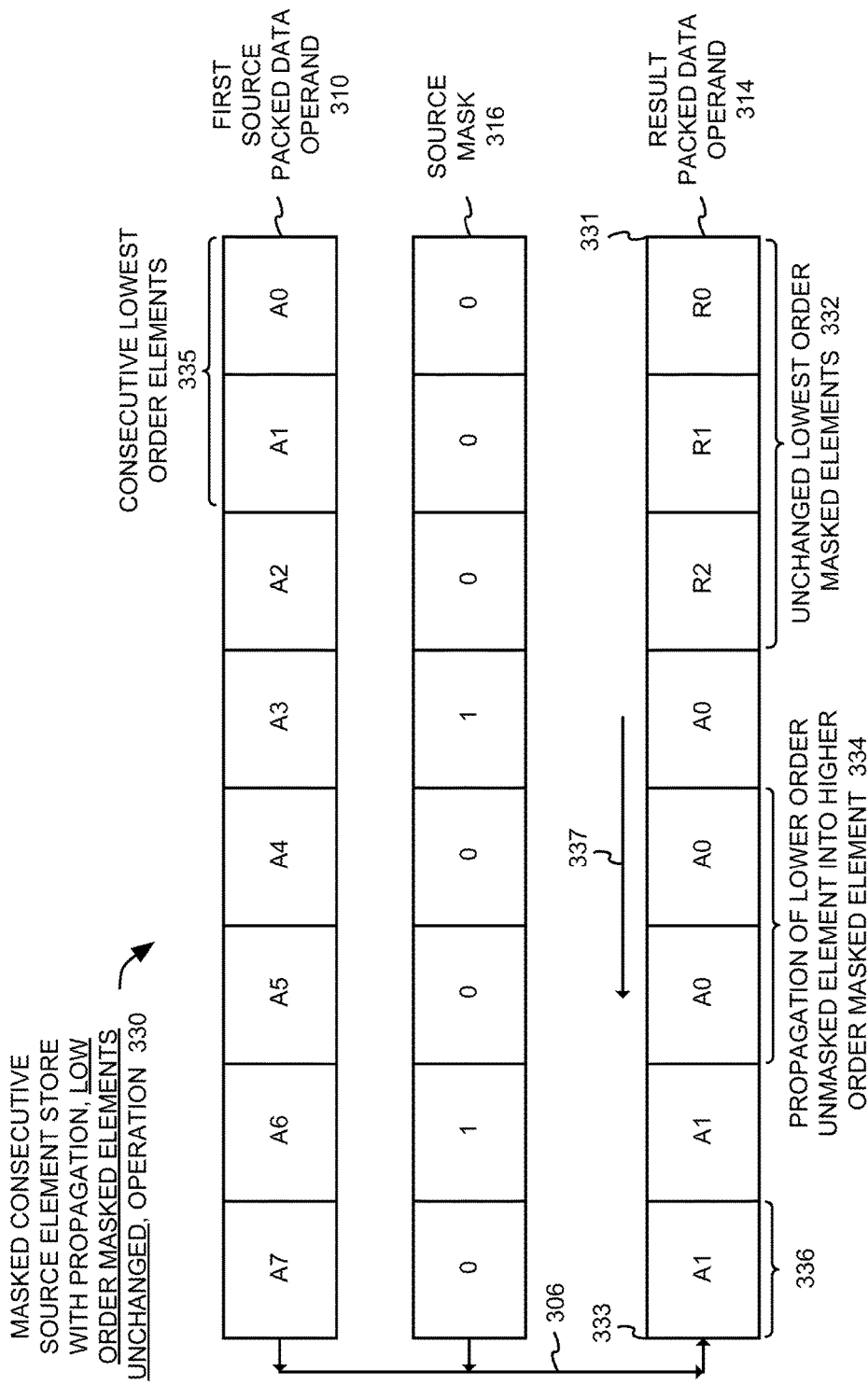
FIG. 3 is a block diagram of an embodiment of a masked consecutive source element store with propagation, lowest order masked elements unchanged, operation.

FIG. 3 is a block diagram illustrating an embodiment of a masked consecutive source element store with propagation, lowest order masked elements unchanged, operation 330 that may be performed in response to an embodiment of an instruction. In this embodiment, a set of zero or more (e.g., in the illustrated example three) lowest order masked result data elements 332, which precede a least significant unmasked result data element (e.g., in the illustrated example A0 in position 3), are left unchanged (e.g., initial or starting values in the destination storage location may not be changed). In the illustration, a least significant or lowest order end orbit position 331 of the result packed data operand is shown on the right, and a most significant or highest order end or bit position 333 is shown on the left, as viewed.

The instruction may specify (e.g., explicitly specify) or otherwise indicate (e.g., implicitly indicate) the first source packed data operand 310, which may have a first plurality of (e.g., at least four) packed data elements. In the illustrated embodiment, the first source packed operand data has eight data elements A0 through A7, although the scope of the invention is not so limited. In other embodiments, the first source packed data operand may have a different number of data elements, for example, a number equal to the size in bits of the first source packed data operand divided by the size in bits of each data element. In the illustrated embodiment, a lowest order set of consecutive data elements 335 includes a lowest order data element (A0) in position 0, and a next lowest order data element (A1) in position 1. In various embodiments, the width of the first source packed data operand may be 64-bits, 128-bits, 256-bits, 512-bits, or 1024-bits, although the scope of the invention is not so limited. In various embodiments, the width of each packed data element may be 8-bits, 16-bits, 32-bits, or 64-bits, although the scope of the invention is not so limited. In some embodiments, the first source packed data operand may be stored in a packed data register In oilier embodiments, the first source packed data operand may optionally be stored in a memory location, which may allow source data elements to be stored directly from the memory location to the result packed data operand, without needing to first load them into a packed data register.

The instruction may also specify or otherwise indicate a source mask 316. The source mask may include a plurality of mask elements. For example, the source mask may include a same number of mask elements as a number of result data elements in the result packed data operand 314. In the illustrated embodiment, the source mask has eight mask elements. Each mask element may correspond to one of the result data elements of the result packed data operand in a same relative position within the operands. As shown, in some embodiments, each mask dement may be a single mask bit, although the scope of the invention is not so limited. According to the convention used in the illustrated embodiment, a mask element cleared to a value of binary zero (i.e., 0) represents a masked-out or masked mask element, whereas a mask element set to a value of binary one (i.e., 1) represents an unmasked mask element. The opposite convention is also possible. In the particular illustrated example, the eight mask bits have, from a highest order position (on the left), to a lowest order bit position (on the right), the binary values 0, 1, 0, 0, 1, 0, 0, 0. These arc only example values. In some embodiments, the source mask may be stored in a packed data operation mask register. In some embodiments, other instructions of an instruction set may indicate (e.g., have bits or a field to specify) the mask register and use the mask register and/or a mask stored therein as a predicate operand and/or to predicate packed data operations.

The result packed data operand 314 may be generated and stored (e.g., by an execution unit 306) in a destination storage location in response to and/or as a result of the embodiment of the instruction. In various embodiments, the destination storage location may be a packed data register, a memory location, or other storage location. The result packed data operand may include a plurality of (e.g., optionally at least four) result data elements. For example, the result packed data may include a same number of result data elements as a number of data elements of the first source packed data operand and/or a same number of mask elements of the source mask. In the illustrated embodiment, the result packed data has eight result data elements, although the scope of the invention is not so limited. Each result data element may correspond to a different mask element in the source mask in a same relative position within the operands.

The eight result data elements occupy data element positions 0 through 7, when moving from a lowest order end or bit position 331 (on the right) to a highest order end or bit position 333 (on the left). In the illustrated example, the result data element (A0) in position 3 corresponds to an unmasked mask element (e.g., the corresponding mask element in position 3 has a value of binary one). Also, the result data element (A0) in position 3 is the lowest order unmasked result data element and/or the closest unmasked result data element to the lowest order end or bit position 331. In the illustrated example, the three lowest order (rightmost) result data elements in positions 0 through 2 each correspond to a masked-out mask element (e.g., the corresponding mask elements in positions 0 through 2 have values of binary zero). This set of three lowest order masked result data elements in positions 0 through 2 are between the lowest order end or bit position 331 and the lowest order unmasked result data element (A0) in position 3. As shown at 332, in this embodiment, all of the result data elements in this set of lowest order masked result data elements, which precede a least significant unmasked result data element, may be left unchanged. For example, the initial or starting data elements in the destination storage location (e.g., a register) may be left unchanged and/or not updated by the operation instruction. By way of example, the destination storage location may initially store data elements R0 through R2 in the three lowest order data element positions. After the operation/instruction, data elements R0 through R2 may remain stored in the three lowest order data element positions of the destination storage location and/or the result packed data operand.

In some embodiments, the lowest order data element of the set of consecutive data elements 335 of the first source packed data operand may be stored to the lowest order unmasked result data element. For example, the value of data element (A0) from position 0 may be stored in the unmasked result data element in position 3 of the result packed data operand. The lowest older unmasked mask element in position 3 of the source mask may select the corresponding lowest order unmasked result data element in position 3 of the result packed data operand as a suitable storage location for the lowest order source data element (e.g., A0) from the first source packed data operand.

The result data elements In positions 4 and 5 ore masked result data elements that correspond to masked-out mask elements (e.g., with values of 0). In some embodiments, as shown at 334, the value of the nearest lower order unmasked result data element (in this case data element A0 in position 3) may be propagated or otherwise stored in each of these higher order masked result data elements in positions 4 and 5 up to, but not including, the next higher order unmasked result data element (e.g., data element A1 in position 6). That is, in some embodiments, the value of the nearest lower order unmasked result data element may be stored to a set of zero or more higher order masked result data elements. An arrow 337 shows that the direction of the storage or propagation may be in Increasing bit significance or order.

The result data element in position 6 is an unmasked result data element. In some embodiments, the next higher order data element of the set of consecutive data elements 335 of the first source packed data operand may be stored to the unmasked result data element in position 6. For example, as shown, the value of data element (A1) in position 1 of the first source packed data operand may be stored in the unmasked result data element in position 0. The source data element (A1) in position 1 is the next higher order consecutive source data element after the source data element (A0) in position 0. The unmasked mask element in position 6 of the source mask may select the corresponding unmasked result data element in position 6 as a storage location for the next consecutive source data element (e.g., A1).

The next highest order result data element in position 7 is a masked result data element. In some embodiments, as shown at 336, the value of the nearest lower order unmasked result data element (in this example data element A1 in position 6) may be propagated or otherwise stored in the highest order masked result data element in position 7. The masked result data element in position 7 represents a set of zero or more masked result data elements (e.g., in this example a single masked result data element) between the highest order end or bit position 333 and the closest unmasked result data element (e.g., A1 in position 6) to the highest order end or bit position.

As shown, in some embodiments, the set of consecutive or contiguous data elements 335 of the first source packed data operand 310 may be "expanded" to the series of potentially non-contiguous or sparse unmasked result data elements of the result packed data operand 314 that arc selected by the corresponding unmasked elements of the source mask 316. The unmasked elements of the source mask 316 may select the corresponding unmasked result data elements to be replaced by the contiguously ascending consecutive data elements 335 of the first source packed data operand 310. Moreover, values of nearest lower order unmasked result data elements may be propagated or otherwise stored to the adjoining higher order masked result data elements. Advantageously, the operation and/or instruction it is not limited to zeroing these masked result data elements or leaving them unchanged, but rather values of preceding unmasked result data elements may be propagated or otherwise stored therein.

Notice that since the instruction stores consecutive or contiguous source data elements to a series of potentially non-contiguous unmasked result data elements of a result packed data operand of the same size, all source data elements may be contained within a single source packed data operand that is no larger than the result packed data operand. This may allow all of the source data elements to be loaded in a single load operation from memory. In contrast, a gather type of operation gathers data elements from non-contiguous memory locations that may potentially be in different segments, memory pages, or the like. With such gather type operations, there is a greater tendency or risk of page faults occurring, which tend to involve implementation overhead to handle these faults. However, such page faults may not be as problematic for the embodiments or the instructions disclosed herein, since in some embodiments, all source data elements may be contained within a single source packed data operand.

Listed below is pseudocode for a particular example embodiment of a masked consecutive source element store with propagation instruction named VEXPANDPROP. In the pseudocode, MASK is a source mask (e.g., source mask 316). SRC is a source packed data operand (e.g., operand 310) having consecutive elements to be stored or propagated into the destination. DST is a destination that may store the result packed data operand (e.g., operand 314). In various embodiments. SRC and DST may each be 128-bits (e.g., xmm registers), 256-bits (e.g., ymm registers), or 512-bits (e.g., zmm registers), although the scope of the invention is not so limited. In alternate embodiments, other sized registers may be used and/or one or more of the source operands may be token from a memory location or other storage location instead of a packed data register. In addition, in another embodiment, a source operand may optionally implicitly be reused as a destination operand. In the pseudocode, "i" is a position counter within the operands, "i++" means increment "i" (i.e., i=i+1), "n" is a variable that is incremented, "n++" means increment "n" (i.e., n=n+1), VL is the number of data elements within SRC. The data may be byte, word, doubleword, quadword, single precision, or double precision, to name a few examples.

| VEXPANDPROP MASK, SRC, DST |
| --- |
| for(i=0; i<VL; i++){<br>  if(MASK[i]==1) break;} //find a position of a first unmasked element<br>for(n=0; i<VL; i++){ //continue from position of first unmasked element if any<br>  DST[i] = SRC[n];<br>  if(MASK[i]==1) n++;} |

This pseudocode shows that, for the instruction of this embodiment, a lowest order set of masked result data elements in DST preceding the first unmasked element may be left unchanged in DST. Also, since the parameter n starts at zero, and is only incremented by one each time an unmasked mask element is encountered, the parameter n selects consecutive lowest order data elements from SRC (e.g., SRC[n]) to be stored into a series of unmasked result data elements. Also, since the value of n is not incremented for masked mask elements, values of lower order unmasked result elements may be stored into higher order masked result elements.

Figure 4:
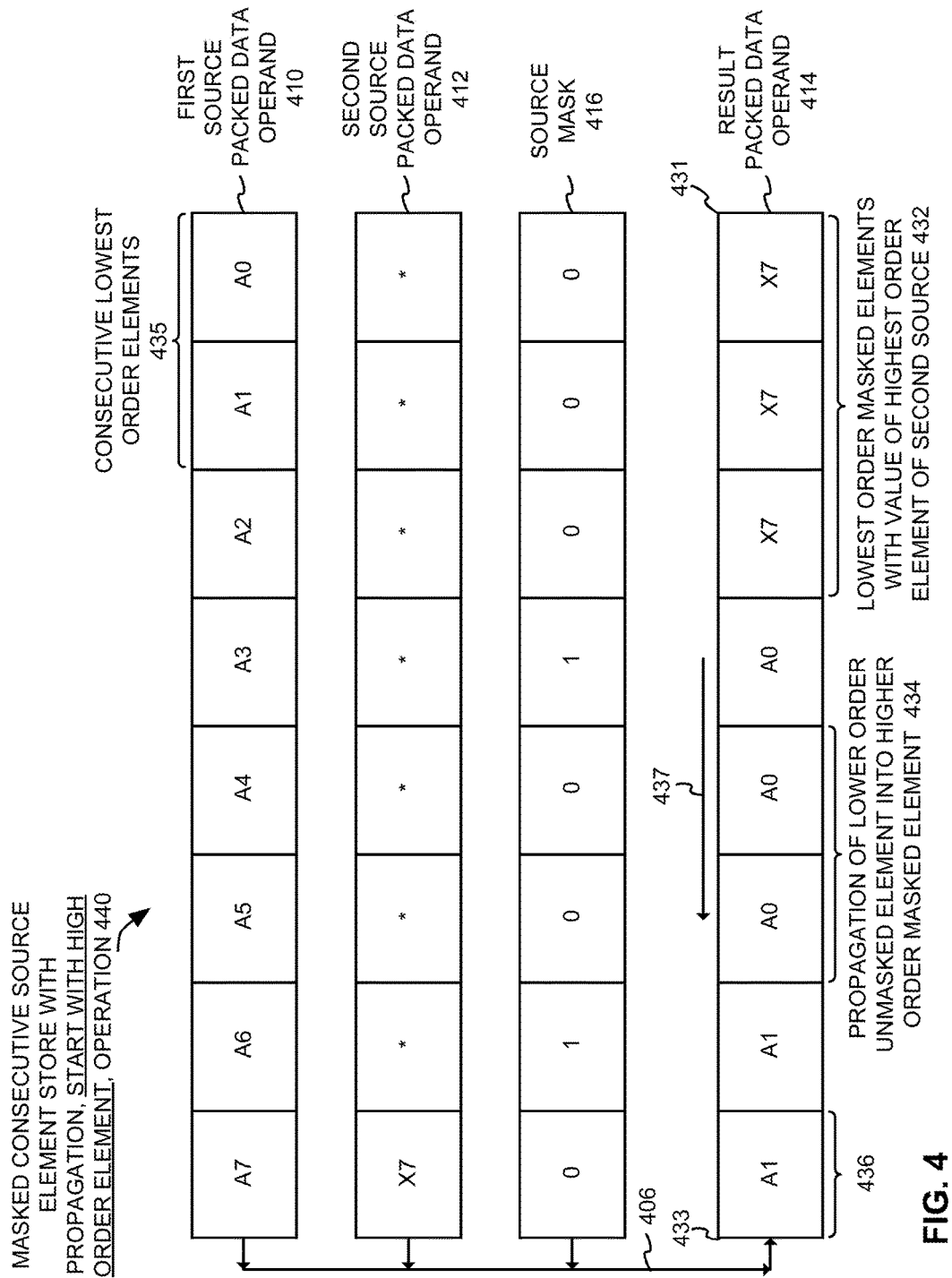
FIG. 4 is a block diagram of an embodiment of a masked consecutive source element store with propagation, lowest order masked elements stored from highest order element, operation.

FIG. 4 is a block diagram illustrating an embodiment of a masked consecutive source element store with propagation, lowest order masked elements stored from highest order element, operation 440 that may be performed in response to an embodiment of an instruction. In this embodiment, the operation stores a value of a highest order data element (e.g., X7) of a second source packed data operand 412 to a set of zero or more (e.g., in the illustrated example optionally three) lowest order masked result data elements 432 of a result packed data operand 414. In the illustration, a least significant or lowest order end or bit position 431 of the result packed data operand is shown on the right, and a most significant or highest order end or bit position 433 of the result packed data operand is shown on the left, as viewed.

The instruction may specify or otherwise indicate a first source packed data operand 410, and may specify or otherwise indicate a source mask 416. The first source packed data operand, and the source mask, may optionally hare any of the characteristics and variations previously described (e.g., for FIG. 3).

The instruction may specify or otherwise indicate a second source packed data operand 412. In this embodiment, the second source packed data operand provides a single highest order data element (e.g., X7), whose value may be used for (e.g., stored into) zero or more (e.g., in the illustrated example three) lowest order masked result data elements 432 in the result packed data operand 414. As will be explained further below, providing the single data element (e.g., X7) in the highest order position of the second source packed data operand may offer an advantage from an algorithmic perspective for certain implementations (e.g., when vectorizing an incrementing loop). For example, the highest order data element (e.g., X7) may represent a value of an immediately prior iteration of a set of prior iterations of a loop (e.g., a vectors worth), and may be used as an input value to a next iteration of a set of iterations. This may help to reduce overhead of preparation for the next set of loop iterations. However, the scope of the invention is not limited to such implementations or advantages.

The result packed data operand 414 may be generated and stored (e.g., by an execution unit 406) in a destination storage location in response to and/or as a result of the embodiment of the instruction. The destination storage location may optionally have any of the characteristics and variations previously described (e.g., for FIG. 3). Aside from the differences mentioned below, the result packed data operand 414 may also have any of the characteristics and variations previously described (e.g., for FIG. 3).

In the illustrated example embodiment, the three lowest order (rightmost) result data elements in positions 0 through 2 each correspond to a masked-out mask element (e.g., the mask elements in position 0 through 2 have values of binary zero). As shown at 432, these three lowest order masked result data elements in positions 0 through 2 are between the lowest order end or bit position 431 and the lowest order unmasked result data element (A0) in position 3. In this embodiment, the value of the single highest order data element (X7) of the second source packed data operand 412 is stored in all three lowest order masked-out result data elements 432 that precede the lowest order unmasked result data element (e.g., in this case A0 in position 3) of the result packed data. As shown, the remainder of the result packed data operand 414 may be similar to or the same as the result packed data operand 314 of FIG. 3.

Listed below is pseudocode for a particular example embodiment of a masked consecutive source element store with propagation, start with high order source element, instruction named VEXPANDPROPHIGH. SRC1 is a source packed data operand (e.g., operand 412) having a single highest order data element (e.g. at position VL-1) to be stored in a set of zero or more lowest order masked elements of the result packed data operand in DST. SRC2 is a source packed data operand (e.g., operand 410) having consecutive elements to be stored or propagated in the destination. The tmp_val is a temporary value or variable.

| VEXPANDPROPHIGH MASK, SRC1, SRC2, DST |
|---|
| ```
tmp_val=SRC1[VL-1]
for(i=0; n=0; i<VL; i++){
  if(MASK[i]==1){
    tmp_val = SRC2[n];
    n++; }
  DST[i] = tmp_val; }
``` |

Figure 5:
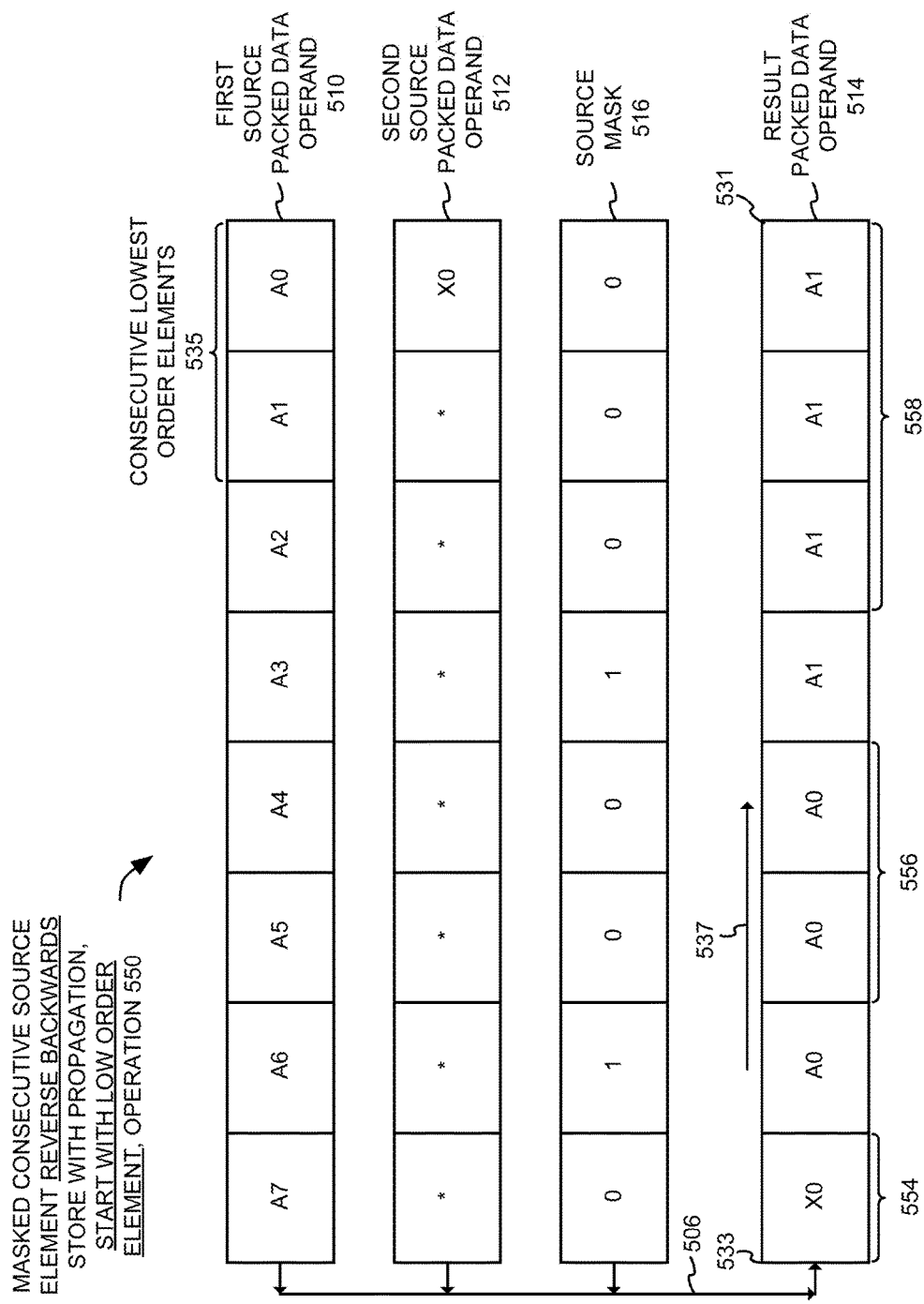
FIG. 5 is a block diagram of an embodiment of a masked consecutive source element reverse and backwards store with propagation, highest order masked elements stored from lowest order element, operation.

This pseudocode shows that, for die instruction of this embodiment, a lowest order set of zero or more masked result data elements in DST may store the highest order data element of SRC1. Also, since n is incremented each time satisfied unmasked mask element is encountered, and n is used to select the next data element from SRC2 (e.g., SRC2[n]), each unmasked result data element in a series may store a respective consecutive source data element from SRC2. Also, since the value of n is not incremented when masked mask elements are encountered. values of lower order unmasked result elements may be propagated or stored into higher order masked result elements, up to (but not including) the next unmasked result data element FIG. 5 is a block diagram illustrating an embodiment of a masked consecutive source element reverse and backwards store with propagation, highest order masked elements stored from lowest order element, operation 550 that may be performed in response to an embodiment of an instruction. In this embodiment a value of a lowest order data element (e.g., X0) of a second source packed data operand 512 may be stored to values of I set of zero or more (e.g., in the illustrated example optionally one) highest order masked result data elements 554 that precede a highest order unmasked result data element (e.g., in the illustrated example A0 in position 6). In this embodiment propagation is in a "reverse" direction of decreasing bit significance or order. Also, this embodiment is "backwards" in that bit significance or order of data elements in the first source packed data operand 510 is opposite or backwards of that in the result packed data operand 514. In the illustration, a least significant or lowest order end or bit position 531 of the result packed data operand is shown on the right, and a most significant or highest order end or bit position 533 of the result packed data operand is shown on the left as viewed.

The instruction may specify or otherwise indicate a first source packed data operand 510, and a source mask 516. The first source packed data operand, and the source mask, may optionally have any of the characteristics and variations previously described (e.g., for FIGS. 3-4).

The instruction may also specify or otherwise indicate a second source packed data operand 512. In this embodiment, the second source packed data operand provides a single lowest order data element (e.g., X0). A value of the lowest order data element (X0) may be used for (e.g., stored to) a set of zero or more (e.g., in the illustrated example one) highest order masked result data elements 554 in a result packed data operand 514. As will be explained further below, providing the single data element (e.g., X0) in the lowest order position of the packed data operand may offer an advantage from an algorithmic perspective for certain implementations (e.g., when vectorizing a decrementing or backwards counting loop). For example, the lowest order data element (e.g., X0) may represent a last value generated during a prior set of decrementing iterations, which may be used as an input value to a new set of decrementing iterations. However, the scope of the invention is not limited to such implementations or advantages. Otherwise, the second source packed data operand may optionally have any of the characteristics and variations previously described.

The result packed data operand 514 may be generated and stored (e.g., by an execution unit 506) in a destination storage location in response to and/or as a result of the embodiment of the instruction. The destination storage location may optionally have any of the characteristics and variations previously described (e.g., for FIGS. 3-4). Aside from the differences mentioned below, such as using the lowest order data element (e.g., X0) of the second source packed data operand, and the reverse order aspect, the result packed data operand 514 may optionally have any of the characteristics and variations previously described (e.g., for FIGS. 3-4).

In the illustrated example embodiment, the highest order result data element in position 7 is a masked result data element. This highest order masked result data element is between the highest order end or bit position 533 and the highest order unmasked result dam element (e.g., in this example AO in position 6). In this embodiment, die highest order masked result data element stores a value of the lowest order data element (e.g., X0) of the second source packed data operand.

The next highest order result data element in position 6 is a highest order unmasked result data element. As shown, the highest order unmasked result data element in position 6 may store a value of a lowest order source data element (e.g., A0 in position 0) of a set of consecutive lowest order data elements 535 of the first source packed data operand 510. The bit order or significance of the source and result data elements is backwards or flipped in this embodiment. As one example, this may be used in an implementation (e.g., vectorization of a loop) involving a decrementing loop counter (i.e., i=i−1) with an incrementing position n (i.e., n=n+1). In this case reading of consecutive source data elements (e.g., SRC[n]) goes in ascending or forward order, while storing of result elements in the result packed data operand (e.g., DST[i]) goes in backwards opposite order. In the illustrated example, the next two lower order result data elements in positions 4 and 5 arc masked result data elements. As shown, in some embodiments, die value of the nearest higher order unmasked result data element (e.g., in this example A0 in position 6) may be propagated or otherwise stored to these lower order masked result data elements in positions 4 and 5. In this embodiment propagation is from a higher order unmasked result data element to one or more (e.g., in this example optionally two) lower order masked result data elements. An arrow 537 shows that a direction of propagation or storage is in decreasing bit significance or order. Notice that the direction is reverse or opposite that of the embodiments of FIGS. 3-4.

The next lower order result data element in position 3 is an unmasked result data element The unmasked result data element in position 3 stores the next higher order consecutive source data element (e.g., A1 in position 1) of the set of consecutive lowest order data elements 535 of the first source packed data operand. The data element AI in position 1 is the next consecutive data element after the data element A0 in position 0 when moving from lower order to higher order positions across the first source packed data operand. The unmasked mask element in position 3 of the source mask may effectively select the corresponding unmasked result data element in position 3 of the result packed data operand as a suitable storage location for the next consecutive source data element (e.g., A1). In the illustrated example, the three lowest order result data elements in positions 0 through 2 are a set of masked result data elements. As shown, the lowest order masked result data elements in positions 0 through 2 may each store a value of the closest higher order unmasked result data element (e.g., A1 in position 3).

Listed below is pseudocode for a particular example embodiment of a masked consecutive source element reverse and backward store with propagation, start with low order element instruction named VEXPANDPROPREVB-WLOW. SRC1 is a source packed data operand (e.g., operand 512) having a single lowest order data element to be stored in a set of zero or more highest order masked elements of the result packed data operand. SRC2 is a source packed data operand (e.g., operand 510) having consecutive elements to be stored or propagated into the destination. In the code, "i--" means decrement (e.g., t=i-1), and i>=0 conditions "i" being greater than or equal to zero.

| VEXPANDPROPREVBWLOW MASK, SRC1, SKC2, DST |
| --- |
| tmp_val=SRC1[0]<br>for(i=VL-1, n=0; i>=0; i--){<br>  if(MASK[i]==1){<br>    tmp_val = SRC2[n];<br>    n++; }<br>  DST[i] = tmp_val; } |

This pseudocode shows that the instruction of this embodiment stores a lowest order data element of SRC1 to a set of zero or more highest order masked result data elements. A lowest order data element of a set of lowest order consecutive data elements of SRC2 is stored to a highest order unmasked result data element. Higher order unmasked result data elements are propagated or stored to lower order masked result data elements.

Figure 6:
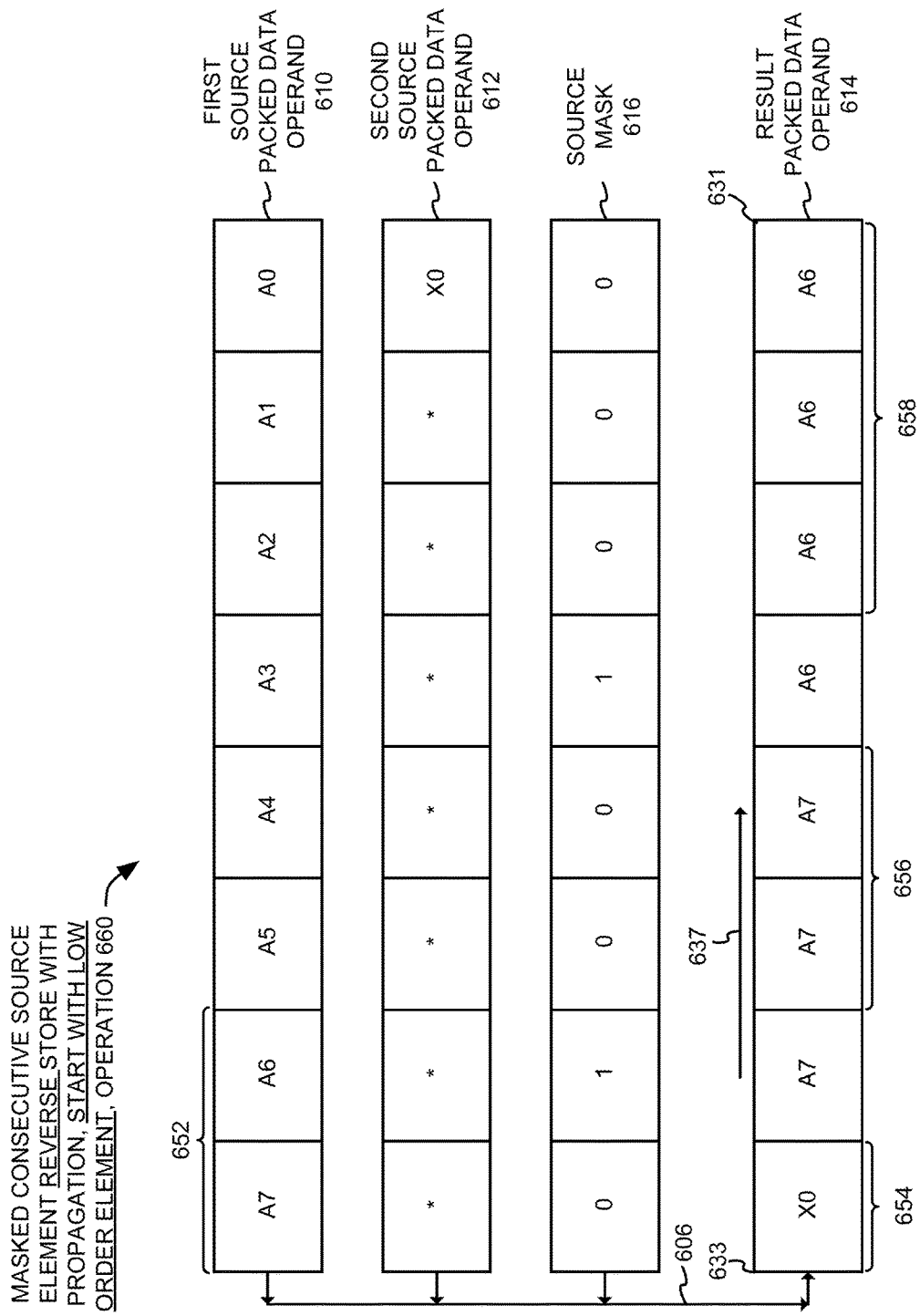
FIG. 6 is a block diagram of an embodiment of a masked consecutive source element reverse store with propagation, highest order masked elements stored from lowest order element, operation.

FIG. 6 is a block diagram illustrating an embodiment of a masked consecutive source element reverse store with propagation, highest order masked elements stored from lowest order element, operation 660 that may be performed in response to an embodiment of an instruction. In this embodiment, a value of a lowest order data element (e.g., X0) of a second source packed data operand 612 may be stored to values of a set of zero or more (e.g., in the illustrated example optionally one) highest order masked result data elements 654 that precede a highest order unmasked result data element (e.g., in the illustrated example A7 in position 6). In the illustration, a least significant or lowest order end or bit position 631 of the result packed data operand is shown on the right, and a most significant or highest order end or bit position 633 of the result packed data operand is shown on the left, as viewed.

The instruction may specify or otherwise indicate n first source packed data operand 610, and a source mask 616. The first source packed data operand, and the source mask, may optionally have any of the characteristics and variations previously described (e.g., for FIGS. 3-5).

The instruction may also specify or otherwise indicate a second source packed data operand 612. In this embodiment, the second source packed data operand provides a single lowest order data element (e.g., X0). A value of the lowest order data element (X0) may be used for (e.g., stored to) a set of zero or more (e.g., in the illustrated example one) highest order masked result data elements 654 in a result packed data operand 614. The second source packed data operand may otherwise optionally have any of the characteristics and variations previously described (e.g., for FIGS. 4-5).

The result packed data operand 614 may be generated and stored (e.g., by an execution unit 606) in a destination storage location in response to and/or as a result of the embodiment of the instruction. The destination storage location may optionally have any of the characteristics and variations previously described (e.g., for FIGS. 3-5). Aside from the differences mentioned below, such as using the lowest order data element (X0) of the second source packed data operand, and the reverse order aspect, the result packed data operand 614 may also have any of the characteristics and variations previously described (e.g., for FIGS. 3-5).

In the illustrated example embodiment, the highest order result data element in position 7 is a masked result data element between the highest order end or bit position 633 and the highest order unmasked result data element (e.g., in this example A7 in position 6). In this embodiment, the highest order masked result data element stores a value of the lowest order data element (e.g., X0) of the second source packed data operand 612. The next higher order result data element in position 6 is an unmasked result data element. As shown, the unmasked result data element in position 6 may store a value of a highest order data element (e.g., A7 in position 7) of a set of consecutive highest order data elements 652 of the first source packed data operand 610. In the illustrated example, the next two lower order result data elements in positions 4 and 5 are masked result data elements. As shown, in some embodiments, the value of the nearest higher order unmasked result data element (e.g., in this example A7 in position 6) may be propagated or otherwise stored to these lower order masked result data elements. In this embodiment propagation is from a higher order unmasked result data element to one or more (e.g., in this example optionally two) lower order masked result data elements. An arrow 637 shows the direction of propagation or storage. Notice that the direction is reverse from that of the embodiments of FIGS. 3-4.

The next lower order result data element in position 3 is an unmasked result data element. The unmasked result data element in position 3 stores the next lower order consecutive source data element (e.g., A6 in position 6) of the set of consecutive highest order data elements 652 of the first source packed data operand. In the illustrated example, the three lowest order result data elements 658 in positions 0 through 2 are a set of masked result data elements. As shown, the lowest order masked result data elements in positions 0 through 2 may each store a value of the closest higher order unmasked result dam element (e.g., A6 in position 3).

Listed below is pseudocode for a particular example embodiment of a masked consecutive source element reverse store with propagation, start with low order element instruction named VEXPANDPROPREVLOW. SRC1 is a source packed data operand (e.g., operand 612) having a single lowest order data element to be stored in a set of zero or more highest order masked elements of the result packed data operand. SRC2 is a source packed data operand (e.g., operand 610) having consecutive elements to be stored or propagated into the destination. The "n--" means decrement "n" (i.e., n=n-1).

| VEXPANDPROPREVLOW MASK, SRC1, SRC2, DST |
| --- |
| tmp_val=SRC1[0]<br>for(i=VL-1, n=VL-1; i>=0; i--){<br>  if(MASK[i]==1){<br>    tmp_val = SRC2[n]; |

VEXPANDPROPREVLOW MASK, SRC1, SRC2, DST

```
         n--; }
         DST[i] = tmp_val; }
```

Considering the embodiments of FIGS. 4-6, in some embodiments, the instructions may optionally implicitly indicate, but not explicitly specify, that a register to be used for the second source packed data operand (e.g., 412, 512, 612) is also to be used as the destination storage location, although this is not required. By way of example, as will be explained further below, in some embodiments, these instructions may be used to vectorize loops. A result of an instruction used to vectorize an initial set of iterations of the loop may be generated and used as an input or starting value for continuity purposes to an instruction used to vectorize a subsequent set of iterations of the loop. Using a register as a source and implicitly as a destination, may help to avoid needing to specify or use another separate register. However, this is optional and not required.

FIGS. 3-6 show several illustrative example embodiments. However, the scope of the invention is not limited to just these embodiments. Other embodiments may include different numbers of data dements, multi-bit mask elements, the source packed data operand need not have the same number of data elements as the result packed data operand, etc. In addition. FIGS. 4-6 show example approaches to provide a single data element or value (e.g., X0 or X7) that is to be used for the values of the lowest order or highest order masked result data elements. However, in various other embodiments, the single data element or value may be provided in an intermediate position in a packed data, in a general-purpose register, in a memory location, or in another storage location. If the single data element or value is sufficiently small (e.g., an 8-bit byte element or a 16-bit word element) to not unduly increase the instruction length for the particular implementation, then it may optionally be provided in an immediate of the instruction.

The instructions disclosed herein are general-purpose instructions. Those skilled in the art and having the benefit of the present disclosure will contemplate various different ways and purposes for using the instructions. In some embodiments, the instructions may be optionally used to facilitate vectorization of loops, such as, for example, loops with computations over scalar value, which is incremented or decremented under condition, although the scope of the invention is not so limited. One illustrative example of such a loop which is incremented under condition is shown in the following pseudocode:

```
         n = 0;
         for(i=0; i<N; i++){
             if(condition[i]) n++;
             x = A[n];
             result[i] = computation(n, x, i); }
```

In this pseudocode, x is it scalar value and "i" is die number of the iteration. The symbol "i++" means that "i" is incremented by one (i.e., i=i+1). Similarly, the symbol "n++" means that "n" is incremented by one (i.e., n=n+1). A1[n] is the n-th element of a vector or array. In this example, the computation depends on the value n, the value of x or A[n], and depending upon the particular implementation may potentially/optionally depend on the number of the iteration "i". Notice that, during iterations of the loop, the value of x is only changed for those iterations where the condition for that iteration is satisfied and n is incremented. If the condition is not satisfied, the value of x does not change. This may be implemented by propagating or storing a value of a data element from one position to another in a result packed data operand.

One illustrative example of a possible use of such characteristics is a multi-state trigger over time. For example, each time a trigger is activated (e.g., a button is pushed) may represent a condition being satisfied. The condition being satisfied may be represented as an unmasked bit in a source mask. In such a case, the trigger may change its current state to a new slate. This may be represented by selecting a next sequential source data element from a source packed data operand. If the trigger is not activated again (e.g., button is not pushed), then the condition is not satisfied again (e.g., represented by no new unmasked mask elements). This may be represented by propagating the value of the data element to masked result date elements.

One challenge is that, currently, it generally tends to be challenging to vectorize such loops, if vectorization is possible at all, due in large part to the data dependency between iterations in the n and x values. For example, there may not be a short enough instruction sequence that would be able to resolve the data dependencies, which could be used by a compiler to vectorize such a loop. Advantageously, embodiments of the instructions disclosed herein may be used to facilitate vectorization of loops, such as, for example, the loop shown in the above pseudocode. For example, the conditions of the iterations may be evaluated, and used to generate a source mask that may be indicated by a vexpandprophigh instruction. For example, mask elements may be made unmasked for conditions evaluated to be true, or mask elements may be made masked for conditions evaluated to be false. Then, the vexpandprophigh instruction may be used to generate a vector of x-values. These x-values may be used in the subsequent computations. SIMD, vector, or packed data processing may be used to process the vector of x-values in parallel.

To further illustrate certain concepts, consider the following example pseudocode of how the example loop above may be vectorized. In this example, zmm* represent 512-bit packed data registers, and KL represent a vector length in number of data elements.

```
zmm1={KL-1:KL-2: ... :2:1:0}  //vector of increment values for
                                iterations
zmm_iterations=zmm1    //initialize vector of incrementing iterations
n=0;
zmm3 = {0:0:0:...:0:0} //initialize zmm3 with zeros
broadcast A[0],zmm4 //initialize zmm4 with A[0]
for(i=0; i+=KL; i<N){   //KL is number of elements in a vector
    k1[KL-1:0]=condition(i+KL-1:i) //generate source mask for KL
                                     iterations
    broadcast n+1,zmm2        //zmm2=n+1:n+1:n+1:...:n+1
    zmm2 += zmm1         //zmm2=n+KL:n+KL-1:...:n+2:n+1
    vexpandprophigh k1,zmm3,zmm2,zmm3// vector of n-values in zmm3
    vexpandprophigh k1,zmm4,&A[n+1],zmm4 //expand source elements,
                                //zmm4=x[i+KL-1:i]=
                                    A[n(i+KL-1):n(i)]
    zmm5=computation(zmm3,zmm4,zmm_iterations) //vector
                                                  computations
    result[i+KL-1:i]=zmm5  //store result
    zmm_iterations += zmm1  //increment vector of iterations
    n += popcnt(k1) }       //increment n by count of bits set in k1
```

In The above, the first vexpandprophigh instruction is used to generate a vector of "n" values for this set of KL iterations in zmm3. This is done by applying the vexpandprophigh instruction to a vector {n0+KL:n0+KL−1: . . . :n0+2:n0+1}, where n0is a resulting value of n on the last iteration in a set of KL iterations preceding a set of current KL iterations. The second instance of the vexpandprophigh instruction is used to expand the source data elements to generate the vector of x-values. In this example, the source data elements are in memory (e.g., &A[n+1]).

To further illustrate, consider an example of an implementation of the above loop in which a vector is used for eight iterations (iterations 0 through 7) of the loop. Initially, the conditions may be evaluated to generate a source mask (k1), and starting data may be established in source operands that may be indicated by the vexpandprophigh instruction.

```
n=0
zmm3 = 0:*:*:*:*:*:*:*  //initialize 0 in highest order data element of zmm3
zmm4 = A[0]:*:*:*:*:*:*:*  //initialize A[0] in highest order data element of zmm4
k1   = 01001000   //source mask for iterations 0-7
zmm2=8:7:6:5:4:3:2:1   //input vector for iterations 0-7
vexpandprophigh k1, zmm3, zmm2, zmm3    //zmm3=2:2:1:1:1:0:0:0
vexpandprophigh k1, zmm4, &A[n+1], zmm4   // zmm4=A2:A2:A1:A1:A1:A0:A0:A0
popcnt(k1)=2   //two bits set in k1
```

Next, another set of eight conditions may be evaluated to generate a new source mask (k1) for iterations 8 through 15. A new set of starting data for the next eight iterations may be stored in a new source operand (zmm2).

```
n=2    // increment n based on popcnt(k1)
zmm3=2:2:1:1:1:0:0:0  //result from previous iterations (0-7)
zmm4=A2:A2:A1:A1:A1:A0:A0:A0 //result from previous iterations (0-7)
k1=  10010100    //control mask for iterations 8-15
zmm2=10:9:8:7:6:5:4:3    //input vector for iterations 8-15
vexpandprophigh k1,zmm3,zmm2,zmm3    //zmm3=5:4:4:4:3:3:2:2
vexpandprophighk1,zmm4,&A[n+1],zmm4
           //zmm4=A5:A4:A4:A4:A3:A3:A2:A2
popcnt(k1)=3 //three set bits in k1
```

This process may be generally repeated for subsequent iterations of the loop.

Figure 7:
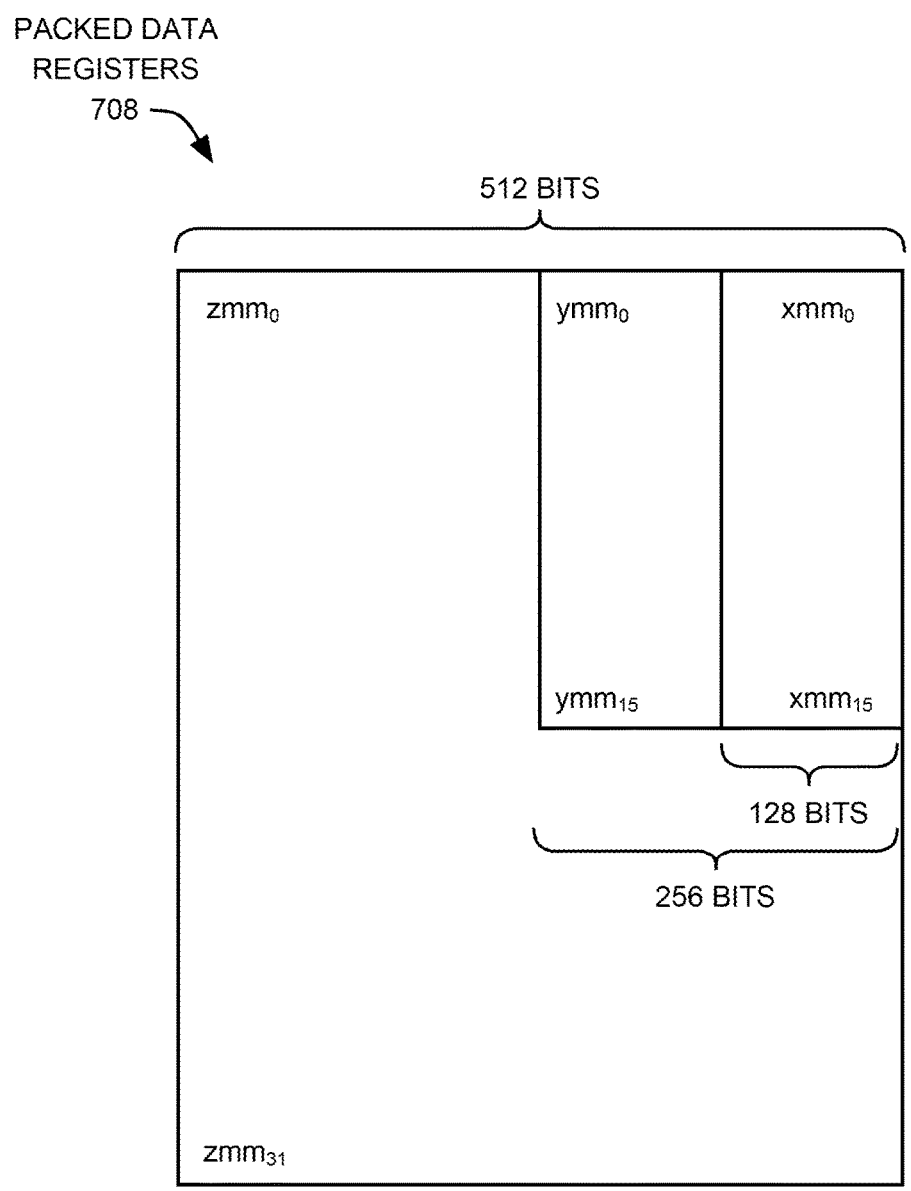
FIG. 7 is a block diagram of an embodiment of a suitable set of packed data registers.

FIG. 7 is a block diagram of an example embodiment of a suitable set of packed data registers 708. The packed data registers include thirty-two 512-bit packed data registers labeled ZMM0 through ZMM31. In the illustrated embodiment, the lower order 256-bits of the lower sixteen registers, namely ZMM0-ZMMI5, are aliased or overlaid on respective 256-bit packed data registers labeled YMM0-YMM15, although this is not required. Likewise, in the illustrated embodiment, the lower order 128-bits of the registers YMM0-YMM15 are aliased or overlaid on respective 128-bit packed data registers labeled XMM0-XMM15, although this also is not required. The 512-bit registers ZMM0 through ZMM31 are operable to hold 512-bit packed data, 256-bit packed data, or 128-bit packed data. The 256-bit registers YMM0-YMM15 are operable to hold 256-bit packed data or 128-bit packed data. The 128-bit registers XMM0-XMM15 are operable to hold 128-bit packed data. In some embodiments, each of the registers may be used to store either packed floating-point data or packed integer data. Different data element sizes are supported including at least 8-bit byte data, 16-bit word data, 32-bit doubleword, 32-bit single-precision floating point data, 64-bit quadword, and 64-bit double-precision floating point data. In alternate embodiments, different numbers of registers and/or different sizes of registers may be used. In still other embodiments, registers may or may not use aliasing of larger registers on smaller registers and/or may or may not be used to store floating point data.

Figures 8, 9:
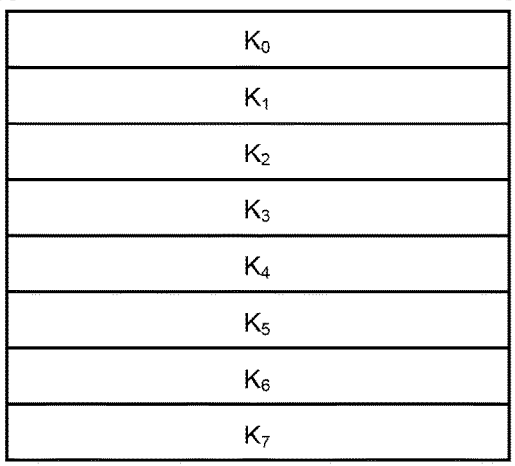
FIG. 8 is a table illustrating that a number of mask bits depends upon a packed data width and a packed data element width.
FIG. 9 is a block diagram of an embodiment of a suitable set of packed data operation mask registers.

FIG. 8 is a table 890 illustrating that the number of mask bits depends upon the packed data width and the packed data element width. Packed data widths of 128-bits, 256-bits, and 512-bits are shown, although other widths are also possible. Packed data element widths of 8-bit bytes, 16-bit words, 32-bit doublewords (dwords) or single precision floating point, and 64-bit quadwords (Qwords) or double precision floating point are considered, although other widths are also possible.

FIG. 9 is a block diagram of an example embodiment of a suitable set of packed data operation mask registers 908. Each of the packed data operation mask registers may be used to store a packed data operation mask. In the illustrated embodiment, the set includes eight registers labeled k0 through k7. Alternate embodiments may include either fewer than eight registers (e.g., two, four, six, etc.), or more than eight registers (e.g., sixteen, thirty-two, etc.). In the illustrated embodiment, each of the registers is 64-bits. In alternate embodiments, the widths of the registers may be either wider than 64-bits (e.g., 80-bits, 128-bits, etc.), or narrower than 64-bits (e.g., 8-bits, 16-bits, 32-bits, etc). The registers may be implemented in different ways using well known techniques and are not limited to any known particular type of circuit. Examples of suitable registers include, but are not limited to, dedicated physical registers, dynamically allocated physical registers using register renaming, and combinations thereof. By way of example an instruction may use three bits (e.g., a 3-bit field) to encode or specify any one of the eight packed data operation mask registers k0 through k7. In alternate embodiments, either fewer or more bits may be used, respectively, when there are fewer or more packed data operation mask registers. In some embodiments, a mask may be stored in the lowest order bits of these registers, although this is not required.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example the instruction templates of a given instruction format may be defined to have different subsets of the instruction format's fields (the included fields are typically in the some order, but at least some have different bit positions because there are less fields included) and/or defined to have a given field interpreted differently. Thus, each instruction of an ISA is expressed using a given instruction format (and. if defined, in a given one of the instruction templates of that instruction format) and includes fields for specifying the operation and the operands. For example, an exemplary ADD instruction has a specific opcode and in instruction format that includes an opcode field to specify that opcode and operand fields to select operands (source 1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual October 2011; and see Intel® Advanced Vector Extensions Programming Reference. June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 10A:
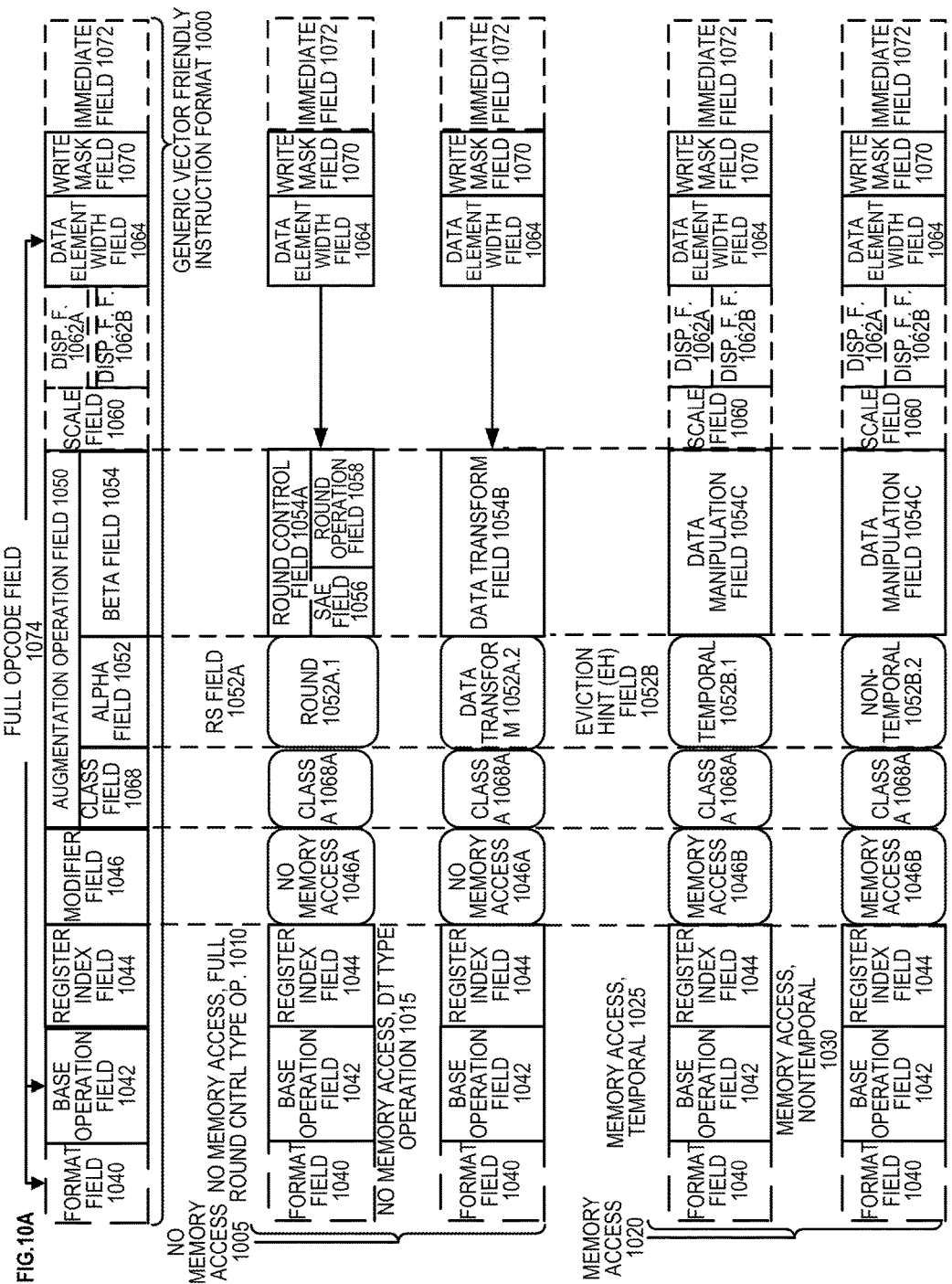
FIGS. 10A-10B are block diagrams illustrating a generic vector friendly instruction format and instruction templates thereof, according to embodiments of the invention.
Figure 10B:
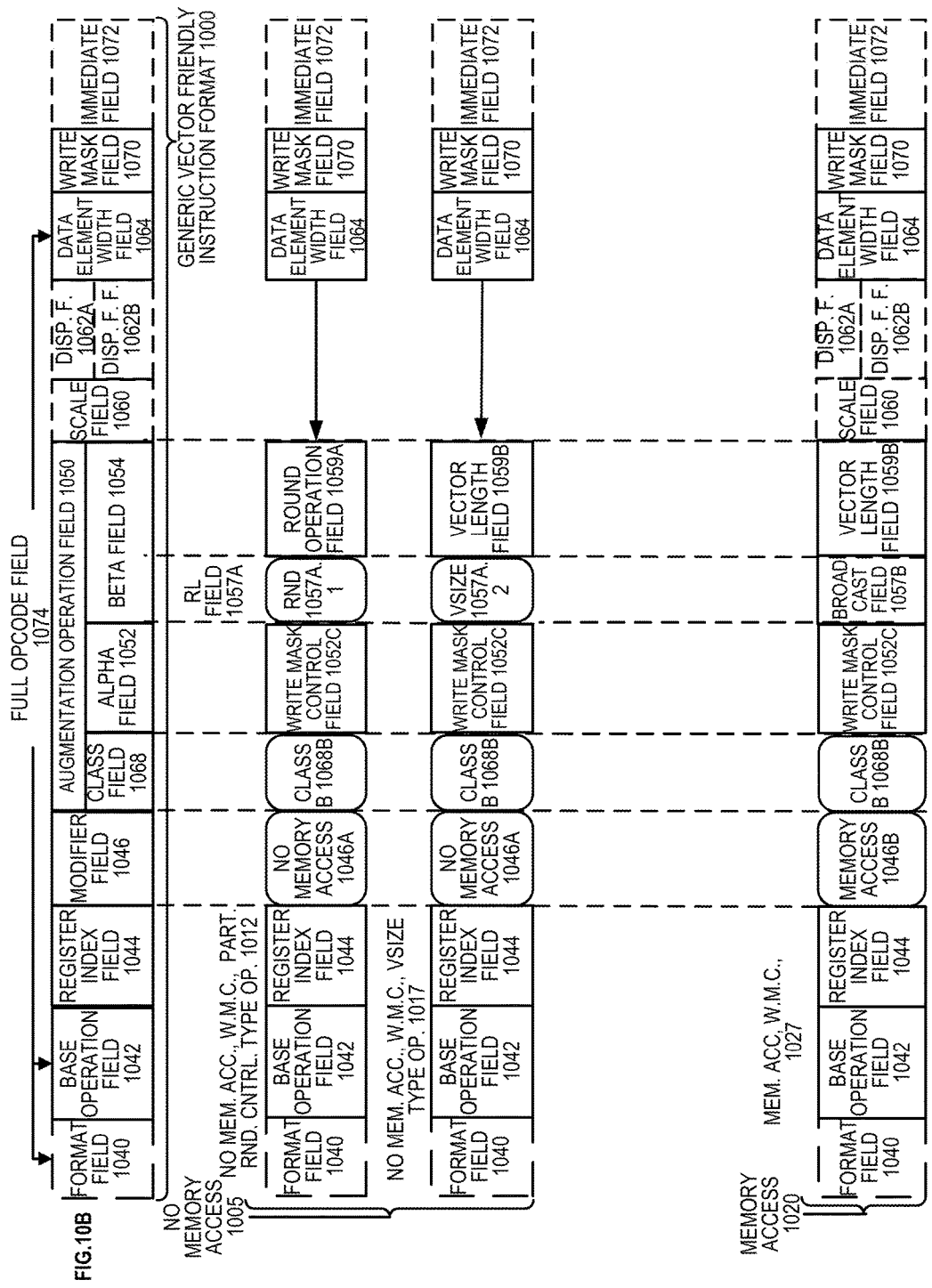

FIGS. 10A-10B are block diagrams illustrating a generic vector friendly instruction formal and instruction templates thereof according to embodiments of the invention. FIG. 10A is a block diagram illustrating a generic vector friendly instruction formal and class A instruction templates thereof according to embodiments of the invention; while FIG. 10B is a block diagram illustrating the generic vector friendly instruction format and class B instruction templates thereof according to embodiments of the invention. Specifically, a generic vector friendly instruction format 1000 for which are defined class A and class B instruction templates, both of which include no memory access 1005 instruction templates and memory access 1020 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) dam element widths).

The class A instruction templates in FIG. 10A include: 1) within the no memory access 1005 instruction templates there is shown a no memory access, full round control type operation 1010 instruction template and a no memory access, data transform type operation 1015 instruction template; and 2) within the memory access 1020 instruction templates there is shown a memory access, temporal 1025 instruction template and a memory access, non-temporal 1030 instruction template. The class B instruction templates in FIG. 10B include: 1) within the no memory access 1005 instruction templates there is shown a no memory access, write mask control, partial round control type operation 1012 instruction template and a no memory access, write mask control, vsize type operation 1017 instruction template; and 2) within the memory access 1020 instruction templates there is shown a memory access, write mask control 1027 instruction template.

The generic vector friendly instruction format 1000 includes the following fields listed below in the order illustrated in FIGS. 10A-10B.

Format field 1040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1042—its content distinguishes different base operations.

Register index field 1044—its content, directly or through address generation, specifies the locations of the source and destination operands, be they in registers or in memory. These include a sufficient number of bits to select N registers from n P×Q (e.g., 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1046—its content distinguishes occurrences of instructions in the generic vector instruction format that specify memory access from those that do not; that is, between no memory access 1005 instruction templates and memory access 1020 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1050—its content distinguishes which one of a variety of different operations to be performed in addition to the base operation. This field is context specific. In one embodiment of the invention, this field is divided into a class field 1068, an alpha field 1052, and a beta field 1054. The augmentation operation field 1050 allows common groups of operations to be performed in a single instruction rather than 2, 3, or 4 instructions.

Scale field 1060—its content allows for the scaling of the index field's content for memory address generation (e.g., for address generation that uses $2^{scale}*\text{index}+\text{base}$).

Displacement Field 1062A—its content is used as part of memory address generation (e.g., for address generation that uses $2^{scale}*\text{index}+\text{base}+\text{displacement}$).

Displacement Factor Field 1062B (note that the juxtaposition of displacement field 1062A directly over displacement factor field 1062B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1074 (described later herein) and the data manipulation field 1054C. The displacement field 1062A and the displacement factor field 1062B are optional in the sense that they are not used for the no memory access 1005 instruction templates and/or different embodiments may implement only one or none of the two.

Data element width field 1064—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from die first to the last one); however, it is not necessary that the elements that are modified be consecutive. Thus, the write mask field 1070 allows for partial vector operations, including loads, stores, arithmetic, logical, etc. While embodiments of the invention are described in which the write mask field's 1070 content selects one of a number of write mask registers that contains the write mask to be used (and thus the write mask field's 1070 content indirectly identifies that masking to be performed), alternative embodiments instead or additional allow the mask write field's 1070 content to directly specify the masking to be performed.

Immediate field 1072—its content allows for the specification of an immediate. This field is optional in the sense that is it not present in an implementation of the generic vector friendly format that docs not support immediate and it is not present in instructions that do not use an immediate.

Class field 1068—its content distinguishes between different classes of instructions. With reference to FIGS. 10A-B, the contents of this field select between class A and class B instructions. In FIGS. 10A-B, rounded corner squares are used to indicate a specific value is present in a field (e.g., class A 1068A and class B 1068B for the claw field 1068 respectively in FIGS. 10A-B).

Instruction Templates of Class A

In the case of the non-memory access 1005 instruction templates of class A, the alpha field 1052 is interpreted as an RS field 1052A, whose content distinguishes which one of the different augmentation operation types are to be performed (e.g., round 1052A.1 and data transform 1052A.2 arc respectively specified for the no memory access, round type operation 1010 and the no memory access, data transform type operation 1015 instruction templates), while the beta field 1054 distinguishes which of the operations of the specified type is to be performed. In the no memory access 1005 instruction templates, the scale field 1060, the displacement field 1062A, and the displacement scale filed 1062B are not present.

No-Memory Access Instruction Templates—Full Round Control Type Operation

In the no memory access full round control type operation 1010 instruction template, the beta field 1054 is interpreted as a round control field 1054A, whose content(s) provide static rounding. While in the described embodiments of the invention the round control field 1054A includes a suppress all floating point exceptions (SAE) field 1056 and a round operation control field 1058, alternative embodiments may support may encode both these concepts into the same field or only have one or the other of these concepts/fields (e.g., may have only the round operation control field 1058).

SAE field 1056—its content distinguishes whether or not to disable the exception event reporting; when the SAE field's 1056 content indicates suppression is enabled, a given i instruction docs not report any kind of floating-point exception flag and does not raise any floating point exception handler.

Round operation control field 1058—its content distinguishes which one of a group of rounding operations to perform (e.g., Round-up, Round-down, Round-towards-zero and Round-to-nearest). Thus, the round operation control field 1058 allows for the changing of the rounding mode on a per instruction basis. In one embodiment of the invention where a processor includes a control register for specifying rounding modes, the round operation control field's 1050 content overrides that register value.

No Memory Access Instruction Templates—Data Transform Type Operation

In the no memory access data transform type operation 1015 instruction template, the beta field 1054 is interpreted as a data transform field 1054B, whose content distinguishes which one of a number of data transforms is to be performed (e.g., no data transform, swizzle broadcast).

In the case of a memory access 1020 instruction template of class A, the alpha field 1052 is interpreted as an eviction hint field 1052B, whose content distinguishes which one of the eviction hints is to be used (in FIG. 10A, temporal 1052B.1 and non-temporal 1052B.2 are respectively specified for the memory access, temporal 1025 instruction template and the memory access, non-temporal 1030 instruction template), while the beta field 1054 is interpreted as a data manipulation field 1054C, whose content distinguishes which one of a number of data manipulation operations (also known as primitives) is to be performed (e.g., no manipulation; broadcast; up conversion of a source; and down conversion of a destination). The memory access 1020 instruction templates include the scale field 1060, and optionally the displacement field 1062A or the displacement scale field 1062B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B. the alpha field 1052 is interpreted as a write mask control (Z) field 1052C, whose content distinguishes whether the write masking controlled by the write mask field 1070 should be a merging or a zeroing.

In the case of the non-memory access 1005 instruction templates of class B, part of the beta field 1054 is interpreted as an RL field 1057A, whose content distinguishes which one of the different augmentation operation types are to be performed (e.g., round 1057A.1 and vector length (VSIZE) 1057A.2 are respectively specified for the no memory access, write mask control, partial round control type operation 1012 instruction template and the no memory access, write mask control. VSIZE type operation 1017 instruction template), while the rest of the beta field 1054 distinguishes which of the operations of the specified type is to be performed.

In the no memory access 1005 instruction templates, the scale field 1060, the displacement field and the displacement scale filed 1062B are not present.

In the no memory access, write mask control, partial round control type operation 1010 instruction template, the rest of the beta field 1054 is interpreted as a round operation field 1059A and exception event repotting is disabled (a given instruction does not report any kind of floating-point exception flag and does not raise any floating point exception handler). Round operation control field 1059A just as round operation control field 1058, its content distinguishes which one of a group of rounding operations to pcrfonn (e.g., Round-up, Round-down, Round-towards-zero and Round-to-nearest). Thus, the round operation control field 1059A allows for the changing of the rounding mode on a per instruction basis. In one embodiment of the invention where a processor includes a control register for specifying rounding modes, the round operation control field's 1050 content overrides that register value.

In the no memory access, write mask control. VSIZE type operation 1017 instruction template, the rest of the beta field 1054 is interpreted as a vector length field 1059B, whose content distinguishes which one of a number of data vector lengths is to be performed on (e.g., 128, 256, or 512 byte).

In the case of a memory access 1020 instruction template of class D, part of the beta field 1054 is interpreted as a broadcast field 1057B, whose content distinguishes whether or not the broadcast type data manipulation operation is to be performed, while the rest of the beta Field 1054 is interpreted the vector length field 1059B. The memory access 1020 instruction templates include the scale field 1060, and optionally the displacement field 1062A or the displacement scale field 1062B.

With regard to the generic vector friendly instruction format 1000. a full opcode field 1074 is shown including the format field 1040, the base operation field 1042, and the data element width field 1064. While one embodiment is shown where the full opcode field 1074 includes all of these fields, the full opcode field 1074 includes less than all of these fields in embodiments that do not support all of them. The full opcode field 1074 provides the operation code (opcode).

The augmentation operation field 1050, the data element width field 1064, and the write mask field 1070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 11 is a block diagram illustrating an exemplary specific vector friendly instruction format according lo embodiments of the invention. FIG. 11 shows a specific vector friendly instruction format 1100 that is specific in the sense that it specifies the location, size, interpretation, and order of the fields, as well as values for some of those fields. The specific vector friendly instruction format 1100 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field. SIB field, displacement field, and immediate fields of the existing x86 instruction set with extensions. The fields from FIG. 10 into which the fields from FIG. 11 map are illustrated.

It should be understood that, although embodiments of the invention are described with reference to the specific vector friendly instruction format 1100 in the context of the generic vector friendly instruction format 1000 for illustrative purposes, the invention is not limited to the specific vector friendly instruction format 1100 except where claimed. For example the generic vector friendly instruction format 1000 contemplates a variety of possible sizes for the various fields, while the specific vector friendly instruction format 1100 is shown as having fields of specific sizes. By way of specific example, while the data element width field 1064 is illustrated as a one bit field in the specific vector friendly instruction formal 1100, the invention is not so limited (that is, the generic vector friendly instruction format 1000 contemplates other sizes of the data element width field 1064).

The generic vector friendly instruction format 1000 includes the following fields listed below in the order illustrated in FIG. 11A.

EVEX Prefix (Bytes 0-3) 1102—is encoded in a four-byte form.

Format Field 1040 (EVEX Byte 0, bits [7:0])—the first byte (EVEX Byte 0) is the formal field 1040 and it contains 0×62 (the unique value used for distinguishing the vector friendly instruction format in one embodiment of the invention). The second-fourth bytes (EVEX Bytes 1-3) include a number of bit fields providing specific capability.

REX field 1105 (EVEX Byte 1, bits [7-5])—consists of a EVEX.R bit field (EVEX Byte 1, bit [7]-R), EVEX.X bit field (EVEX byte 1, bit [6]-X), and 1057BEX byte 1, bit[5]-B). The EVEX.R. EVEX.X. and EVEX.B bit fields provide the same functionality as the corresponding VEX bit fields, and are encoded using in complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1010—this is the first part of the REX' field 1010 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in die inverted format. A value of 1 is used to encode the lower 16 registers. In other words. R'Rrrr is formed by combining EVEX.R', EVEX.R, and the other RRR from other fields.

Opcode map field 1115 (EVEX byte 1, bits [3:0]-mmmm)—its content encodes an implied leading opcode byte (0F, 0F 38, or 0F 3).

Data element width field 1064 (EVEX byte 2, bit [7]-W)—is represented by the notation EVEX.W, EVEX.W is used to define the granularity (size) of the datatype (either 32-bit data elements or 64-bit data elements).

EVEX.vvvv 1120 (EVEX Byte 2, bits [6:3]-vvvv)—the role of EVEX.vvvv may include the following: 1) EVEX.vvvv encodes the first source register operand, specified in inverted (is complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1120 encodes the 4 low-order bits of the first source register specifier stored in inverted (1s complement) form. Depending on the instruction, an extra different EVEX bit field is used to extend the specifier size to 32 registers.

EVEX.U 1068 Class field (EVEX byte 2, bit [2]-U)—If EVEX.U=0, it indicates class A or EVEX.U0: if EVEX.U=1, it indicates class B or EVEX.U1. Prefix encoding field 1125 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H. F3H) in both the legacy formal and in the EVEX prefix format, these legacy SIMD prefixes arc encoded into the SIMD prefix encoding field; and at runtime are expanded into the legacy SIMD prefix prior to being provided to the decoder's PLA (so the PLA can execute both the legacy and EVEX formal of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1052 (EVEX byte 3, bit [7]—EH; also known as EVEX.EH, EVEX.rs, EVEX.RL, EVEX.write mask control, and EVEX.N; also illustrated with $\alpha$)—as previously described, this field is context specific.

Beta field 1054 (EVEX byte 3, bits [6:4]-SSS, also known as $EVEX.s_{2\text{-}0}$, $EVEX.r_{2\text{-}0}$, EVEX.rr1, EVEX.LL0, EVEX.LLB; also illustrated with $\beta\beta\beta$)—as previously described, this field is context specific.

REX' field 1010—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVV is formed by combining EVEX.V', EVEX.vvvv.

Write mask field 1070 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1130 (Byte 4) is also known as the opcode byte. Part of the opcode is specified in this field.

MOD R/M Field 1140 (Byte 5) includes MOD field 1142, Reg field 1144, and R/M field 1146. As previously described, the MOD field's 1142 content distinguishes between memory access and non-memory access operations. The role of Reg field 1144 can be summarized to two situations encoding either the destination register operand or a source register operand, or be treated as an opcode extension and not used to encode any instruction operand. The role of R/M field 1146 may include the following: encoding the instruction operand that references a memory address, or encoding cither the destination register operand or a source register operand.

Scale, Index, Base (SIB) Byte (Byte 6)—As previously described, the scale field's 1050 content is used for memory address generation. SIB.xxx 1154 and SIB.bbb 1156—the contents of these fields have been previously referred to with regard to the register indexes Xxxx and Bbbb.

Displacement field 1062A (Bytes 7-10)—when MOD field 1142 contains 10, bytes 7-10 are the displacement field 1062A, and it works the same as the legacy 32-bit displacement (disp32) and works at byte granularity.

Displacement factor field 1062B (Byte 7)—when MOD field 1142 contains 01, byte 7 is the displacement factor field 1062B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1062B is a reinterpretation of disp8; when using displacement factor field 1062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field I062B substitutes the legacy x86 instruction set 8-bit displacement. Thus, the displacement factor field 1062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1072 operates as previously described.

Full Opcode Field

FIG. 11B is a block diagram illustrating the fields of the specific vector friendly instruction format 1100 that make up the full opcode field 1074 according to one embodiment of the invention. Specifically, the full opcode field 1074 includes the format field 1040, the base operation field 1042, and the data element width (W) field 1064. The base operation field 1042 includes the prefix encoding field 1125, the opcode map field 1115, and the real opcode field 1130.

Register Index Field

FIG. 11C is a block diagram illustrating the fields of the specific vector friendly instruction format 1100 that make up the register index field 1044 according to one embodiment of the invention. Specifically, the register index field 1044 includes the REX field 1105, the REX' field 1110, the MODR/M.reg field 1144, the MODR/M.r/m field 1146, the VVVV field 1120, xxx field 1154, and the bbb field 1156.

Augmentation Operation Field

Figure 11D:
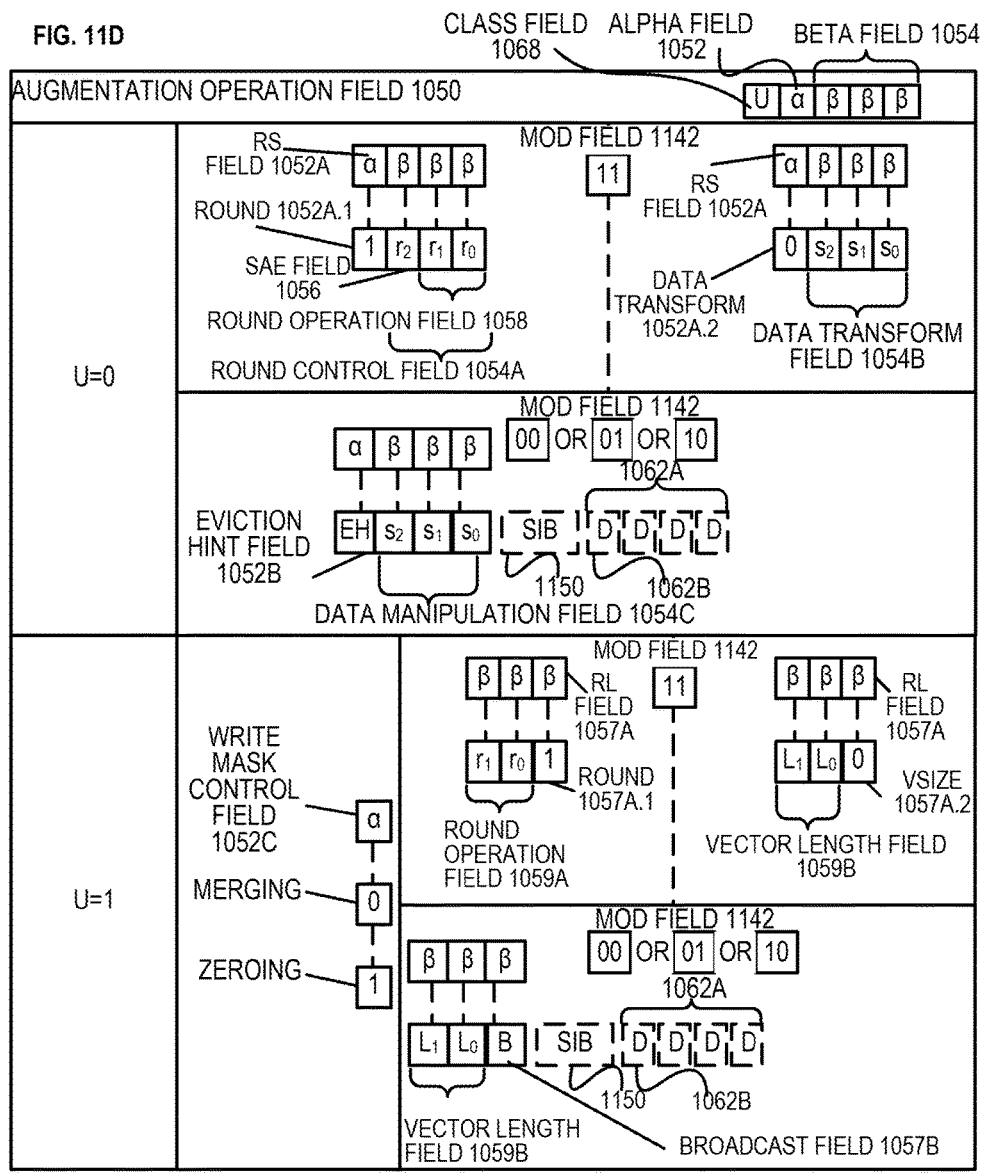
FIG. 11D is a block diagram illustrating fields of a specific vector friendly instruction format that make up an augmentation operation field, according to one embodiment of the invention.

FIG. 11D is a block diagram illustrating the fields of the specific vector friendly instruction formal 1100 that make up the augmentation operation field 1050 according to one embodiment or the invention. When the class (U) field 1068 contains 0, it signifies EVEX.U0 (class A 1068A); when it contains 1, it signifies EVEX.U1 (class B 1068B). When U=0 and the MOD field 1142 contains 11 (signifying a no memory access operation), the alpha field 1052 (EVEX byte 3, bit [7]-EH) is interpreted as the rs field 1052A. When the rs field 1052A contains a 1 (round 1052A.1), the beta field 1054 (EVEX byte 3, bits [6:4]- SSS) is interpreted as the round control field 1054A. The round control field 1054A includes a one bit SAE field 1056 and a two bit round operation field 1058. When the rs field 1052A contains a 0 (data transform 1052A.2), the beta field 1054 (EVEX byte 3, bits [6:4]-SSS) is interpreted as a three bit data transform field 1054B. When U=0 and the MOD field 1142 contains 00,01, or 10 (signifying a memory access operation), the alpha field 1052 (EVEX byte 3, bit [7]-EH) is interpreted as the eviction hint (EH) field 1052B and the beta field 1054 (EVEX byte 3, bits [6:4]-SSS) is interpreted as a three bit data manipulation field 1054C.

When U=1, the alpha field 1052 (EVEX byte 3, bit [7]-EH) is interpreted as the write mask control (Z) field 1052C. When U=1 and the MOD field 1142 contains 11 (signifying a no memory access operation), part of the beta field 1054 (EVEX byte 3, bit [4]-$S_0$) is interpreted as the RL field 1057A; when it contains a 1 (round 1057A.1) the rest of the beta field 1054 (EVEX byte 3, bit [6-5]-$S_{2-1}$) is interpreted as die round operation field 1059A, while when the RL field 1057A contains a 0 (VSIZE 1057.A2) the rest of the beta field 1054 (EVEX byte 3, bit [6-5]-$S_{2-1}$) is interpreted as the vector length field 1059B (EVEX byte 3, bit [6-5]-$L_{1-0}$). When U=1 and the MOD field 1142 contains 00,01, or 10 (signifying a memory access operation), the beta field 1054 (EVEX byte 3, bits [6:4]-SSS) is interpreted as the vector length field 1059B (EVEX byte 3, bit [6-5]-$L_{1-0}$) and the broadcast field 1057B (EVEX byte 3, bit [4]-B).

Exemplary Register Architecture

FIG. 12 Ls a block diagram of a register architecture 1200 according to one embodiment of the invention. In the embodiment illustrated, there are 32 vector registers 1210 that are 512 bits wide; these registers are referenced as zmm0 through zmm31. The lower order 256 bits of the lower 16 zmm registers are overlaid on registers ymm0-16. The lower order 128 bits of die lower 16 zmm registers (the lower order 128 bits of the ymm registers) are overlaid on registers xmm0-15. The specific vector friendly instruction format 1100 operates on these overlaid register file as illustrated in the below tables.

| Adjustable Vector Length | Class | Operations | Registers |
|---|---|---|---|
| Instruction Templates that do not include the vector length field 1059B | A (FIG. 10A; U = 0) | 1010, 1015, 1025, 1030 | zmm registers (the vector length is 64 byte) |
| | B (FIG. 10B; U = 1) | 1012 | zmm registers (the vector length is 64 byte) |
| Instruction templates that do include the vector length field 1059B | B (FIG. 10B; U = 1) | 1017, 1027 | zmm, ymm, or xmm registers (the vector length is 64 byte, 32 byte, or 16 byte) depending on the vector length field 1059B |

In other words, the vector length field 1059B selects between a maximum length and one or more other shorter lengths, where each such shorter length is half the length of the preceding length; and instructions templates without the vector length field 1059B operate on the maximum vector length. Further, in one embodiment, the class B instruction templates of the specific vector friendly instruction formal 1100 operate on packed or scalar single/double-precision floating point data and packed or scalar integer data. Scalar operations are operations performed on the lowest order data element position in an zmm/ymm/xmm register, the higher order data element positions are either left the same as they were prior to the instruction or zeroed depending on the embodiment.

Write mask registers 1215—in the embodiment illustrated, there are 8 write mask registers (k0 through k7), each 64 bits in size. In an alternate embodiment, the write mask registers 1215 are 16 bits in size. As previously described, in one embodiment of the invention, the vector musk register k0 cannot be used as a write mask; when the encoding that would normally indicate k0 is used for a write mask, it selects a hardwired write mask of 0xFFFF, effectively disabling write masking for mat instruction.

General-purpose registers 1225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1245, on which is aliased the MMX packed integer flat register file 1250—in the embodiment illustrated, the x87 stack is an eight-element stack used to perform scalar floating-point operations on 32/64/80-bit floating point data using the x87 instruction set extension; while the MMX registers arc used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include; 1) the coprocessor on a separate chip from the CPU: 2) the coprocessor on a separate die m the same package us a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled lo a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers: etc.). The retirement unit 1354 and the physical register file(s) unit(s) 1358 are coupled to the execution clusters) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled lo the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled 10 one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule singe 1312; 5) the physical register filets) unit(s) 135S and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322, and 8) the retirement unit 1354 and the physical register file(s) unit(s) 1358 perform the commit stage 1324.

The core 1390 may support one or more instructions sets (e.g., the x86 instruction set (with some extensions that have been added with newer versions): the MIPS Instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data Instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including lime sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Inter® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 14B:
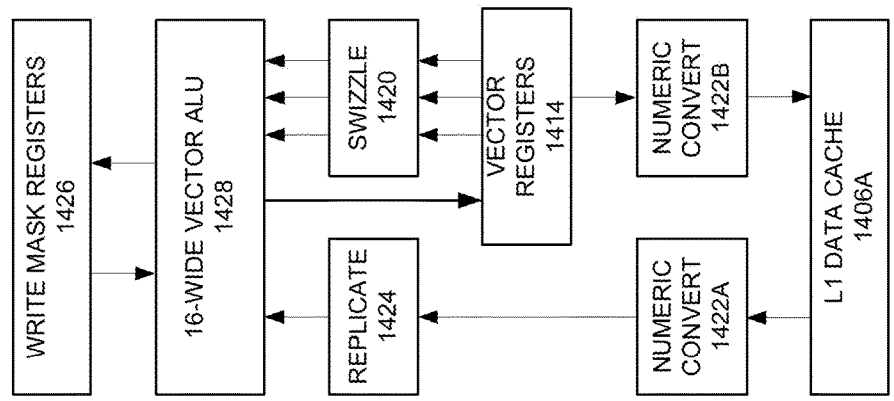
FIG. 14B is a block diagram of an embodiment of an expanded view of part of the processor core of FIG. 14A.
Figure 14A:
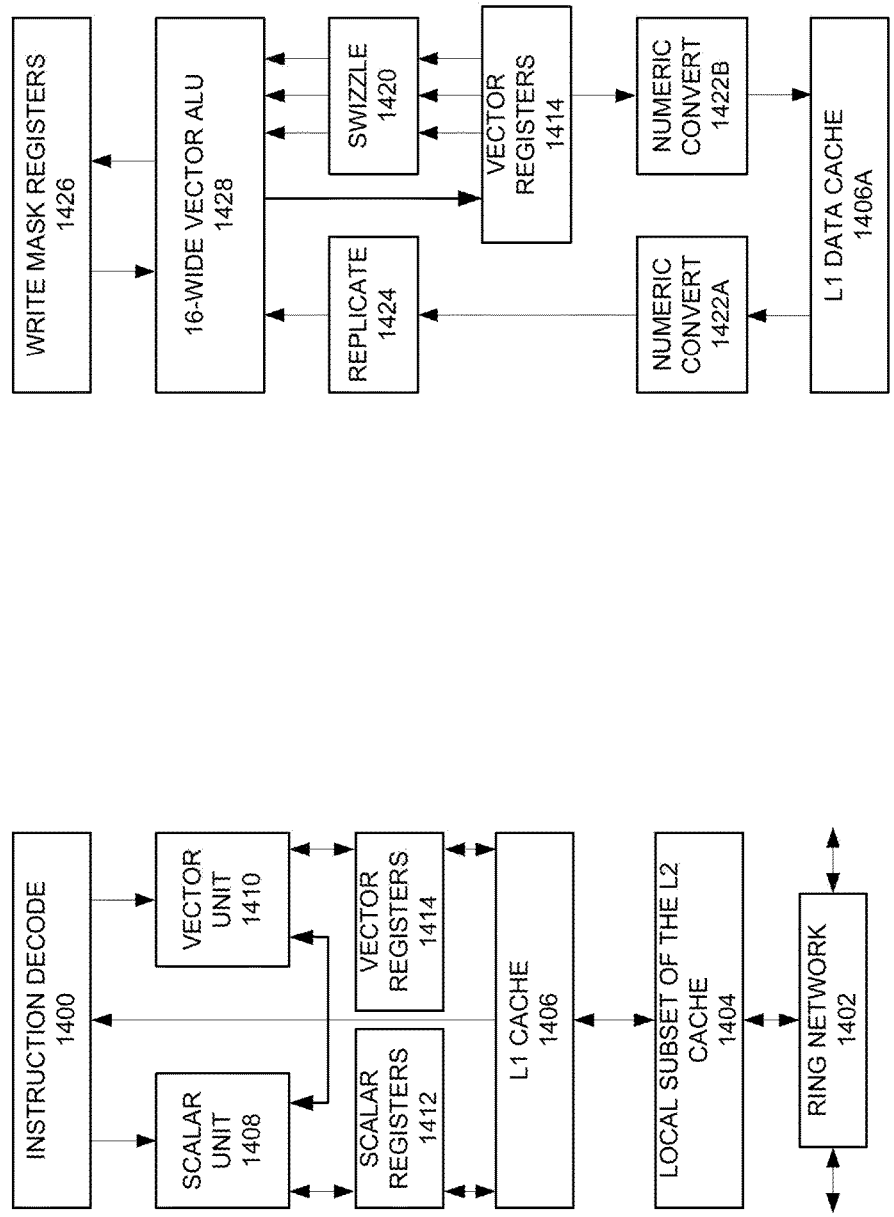
FIG. 14A is a block diagram of an embodiment of a single processor core, along with its connection to the on-die interconnect network, and with its local subset of the Level 2 (L2) cache.

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1402 and with its local subset of the Level 2 (L2) cache 1404, according to embodiments of the invention. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406. alternative embodiments of the invention may use a different approach (e.g., use a single register set or include a communication path that allow data to be transferred between the two register tiles without being written and read back).

The local subset of the L2 cache 1404 is part of a global L2cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Bach ring data-path is 1012-bits wide per direction.

FIG. 14B is an expanded view of part of the processor core in FIG. 14A according to embodiments of the invention. FIG. 14B includes an L1 data cache 1406A part of the L1 cache 1404, as well at more detail regarding the vector unit 1410 and the vector registers 1414. Specifically, the vector unit 1410 is a 16-wide vector processing unit (VPU) (see the 16-wide ALU 1428), which execute one or more of integer, single-precision float, and double-precision float instructions. The VPU supports swizzling the register inputs with swizzle unit 1420, numeric conversion with numeric convert units 1422A-B, and replication with replication unit 1424 on the memory input. Write mask registers 1426 allow predicating resulting vector writes.

Processor With Integrated Memory Controller and Graphics

Figure 15:
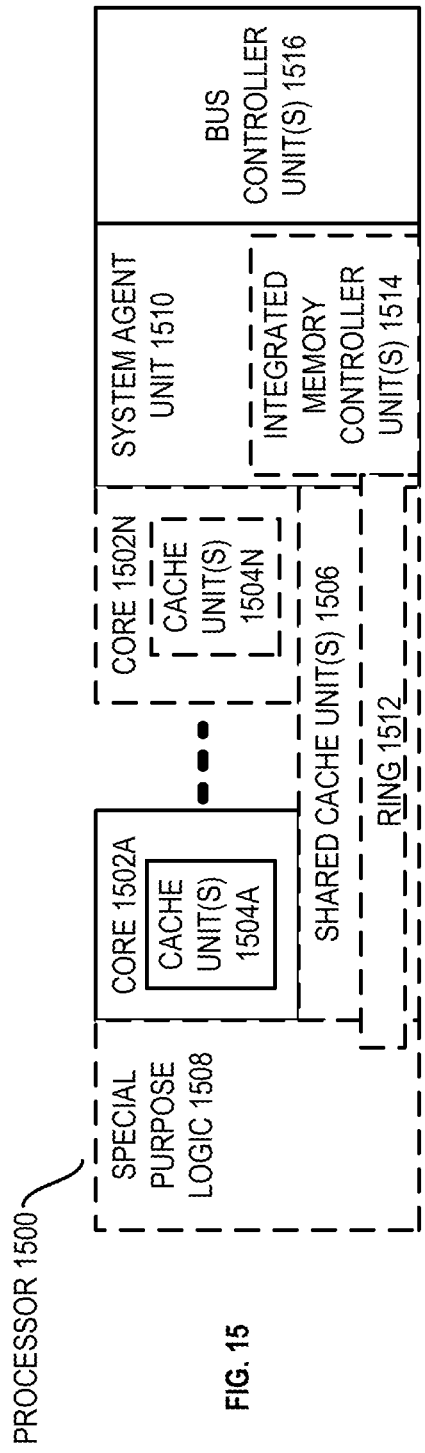
FIG. 15 is a block diagram of an embodiment of a processor that may have more than one core, may have un integrated memory controller, and may have integrated graphics.

FIG. 15 is a block diagram of a processor 1500 that may have more than one core, may have an integrated memory controller, and may have integrated graphics according to embodiments of the invention. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose cut-of-order cores, a combination of the two); 2) a coprocessor with the cores 1502A-N being a large number of special purpose cores intended primarily for graphics and/or scientific (throughput); and 3) a coprocessor with the cores 1502A N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4(L4), or other levels of cache, a last level cache (LLC), and/or combinations thereof. While in one embodiment a ring based interconnect unit 1512 interconnects the integrated graphics logic 1508, the set of shared cache units 1506, and the system agent unit 1510/integrated memory controller unit(s) 1514, alternative embodiments may use any number of well-known techniques for interconnecting such units. In one embodiment coherency is maintained between one or more cache units 1506 and cores 1502-A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Exemplary Computer Architectures

FIGS. 16-19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
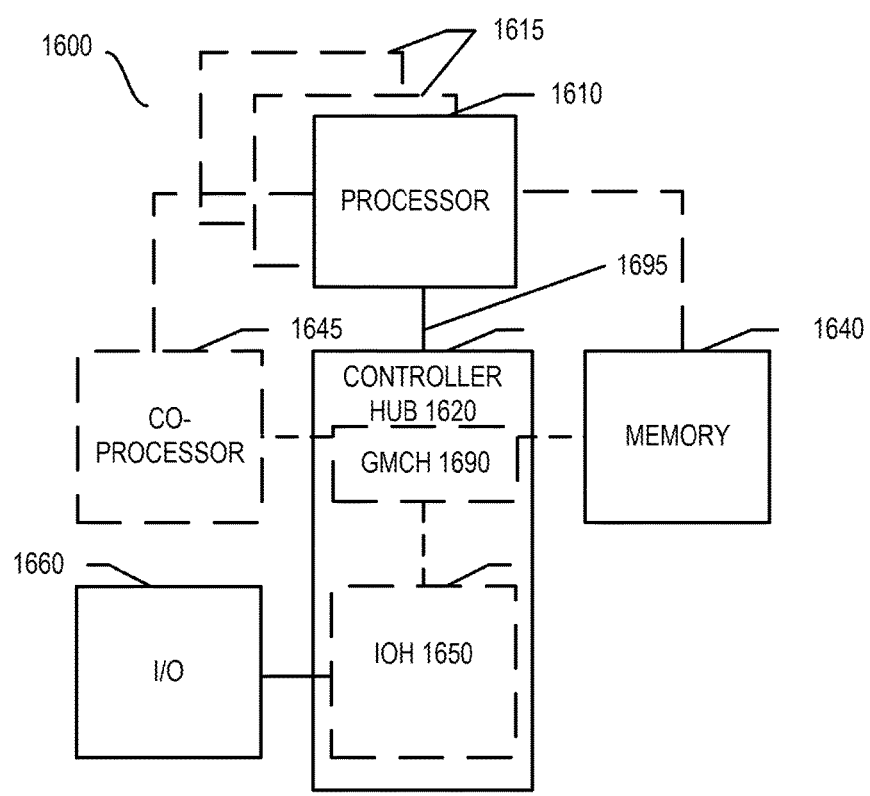
FIG. 16 is a block diagram of a first embodiment of a computer architecture.

Referring now to FIG. 16, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 is couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor. GPGPU, embedded processor, or the like. In one embodiment, controller hub 1620 may include an integrated graphics accelerator. There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, in coprocessor 1645. Coprocessor(s) 1645 accept and execute the received coprocessor instructions.

Figure 17:
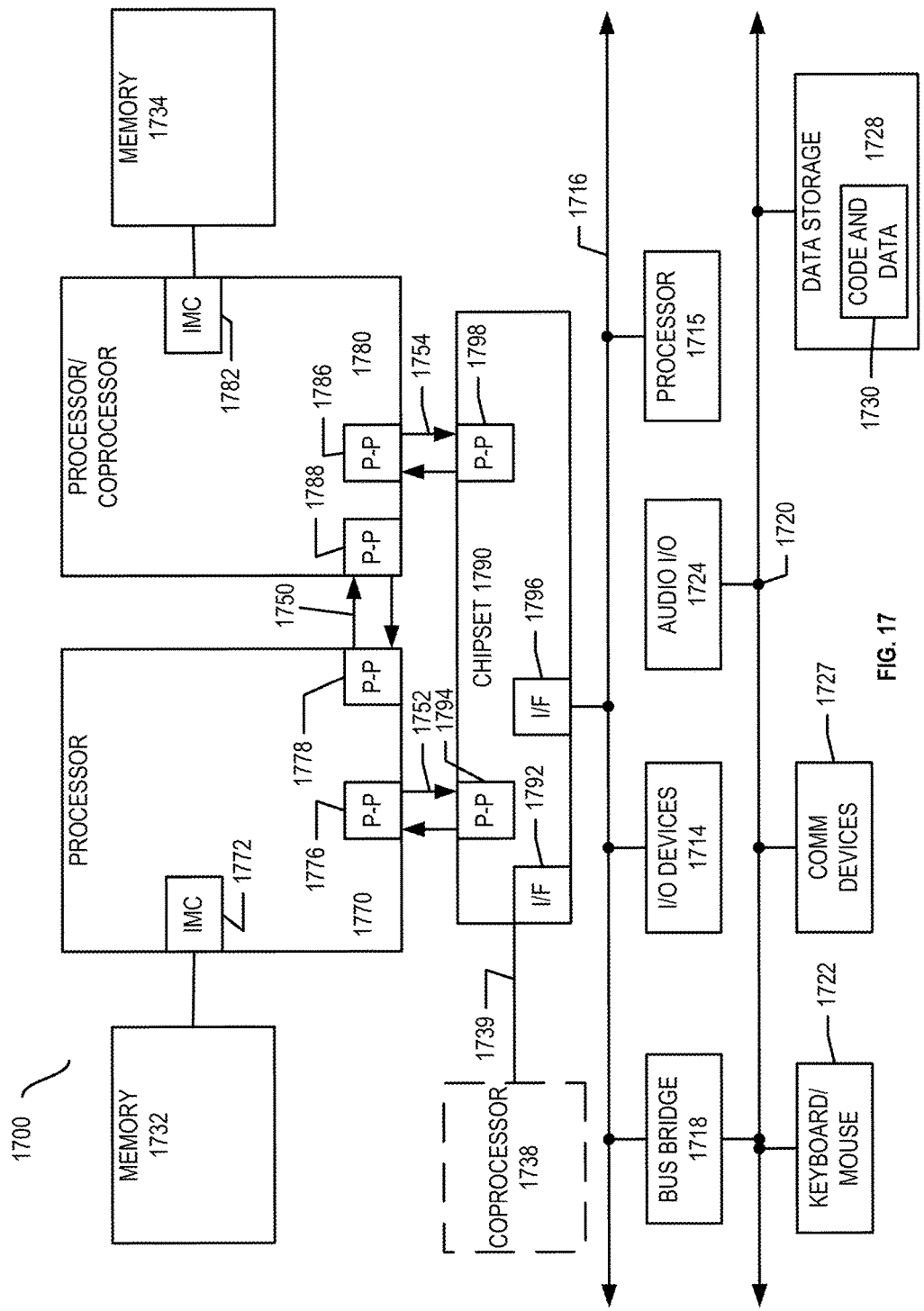
FIG. 17 is a block diagram of a second embodiment of n computer architecture.

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to point interconnect 1750. Each of processors 1770 and 1780 may be some version of the processor 1500. In one embodiment of the invention, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770. 1780 may exchange information via a point-to-point (P-P) interface 1750 using P-P interface circuits 1778, 1788. As shown in FIG. 17. IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 may be coupled to first bus 1716, along with a bus bridge 1718 which couples first bus 1716 to a second bus 1720. In one embodiment, one or more additional processors) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
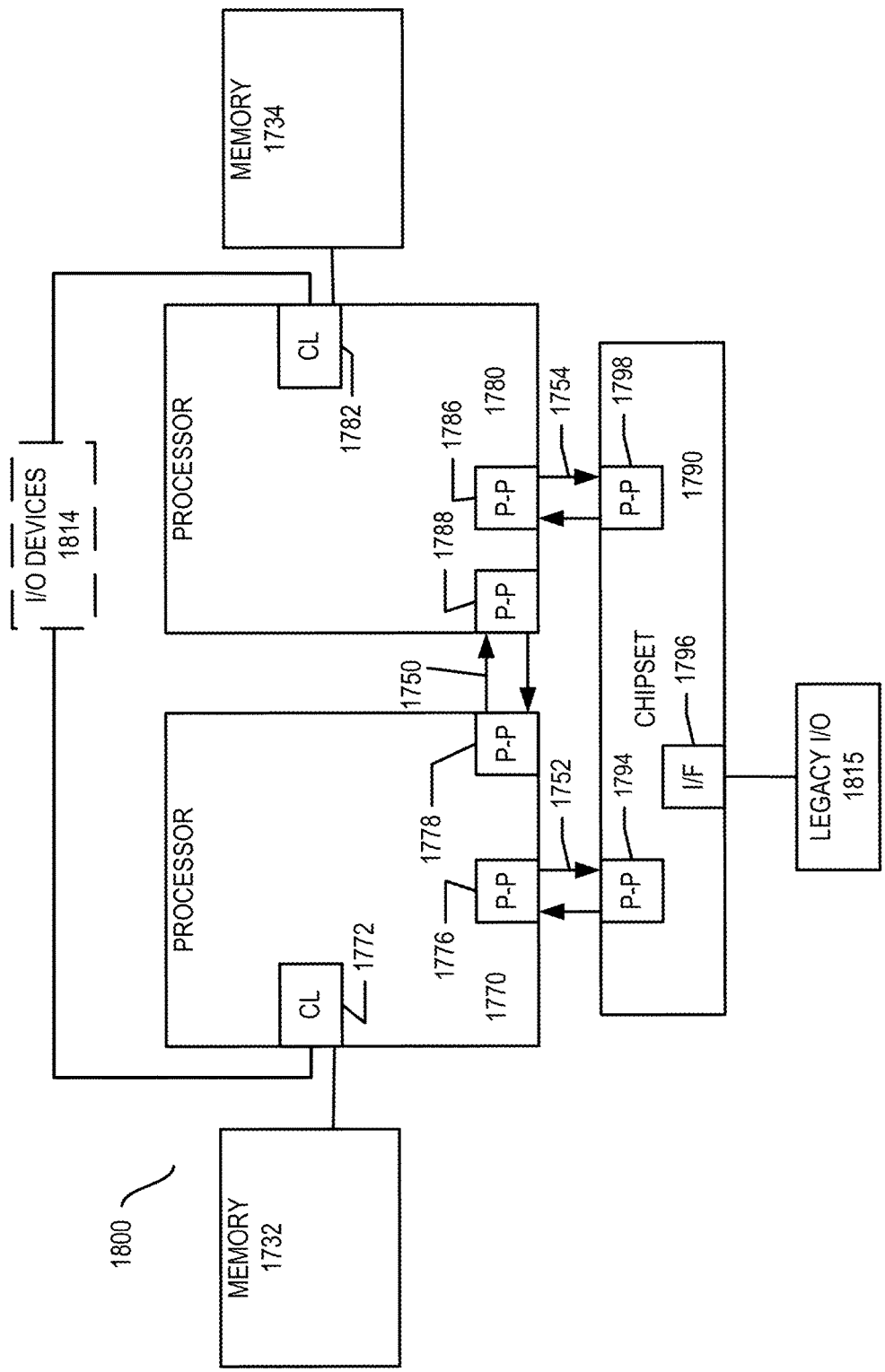
FIG. 18 is a block diagram of a third embodiment of a computer architecture.

Referring now to FIG. 18. shown is a block diagram of a second more specific exemplary system 1800 in accordance with an embodiment of the present invention. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1772 and 1782, respectively. Thus, the CL 1772, 1782 include integrated memory controller units and include I/O control logic. FIG. 18 illustrates that not only are the memories 1732, 1734 coupled to the CL 1772, 1782, but also that I/O devices 1814 are also coupled to the control logic 1772, 1782. Legacy I/O devices 1815 are coupled to the chipset 1790.

Figure 19:
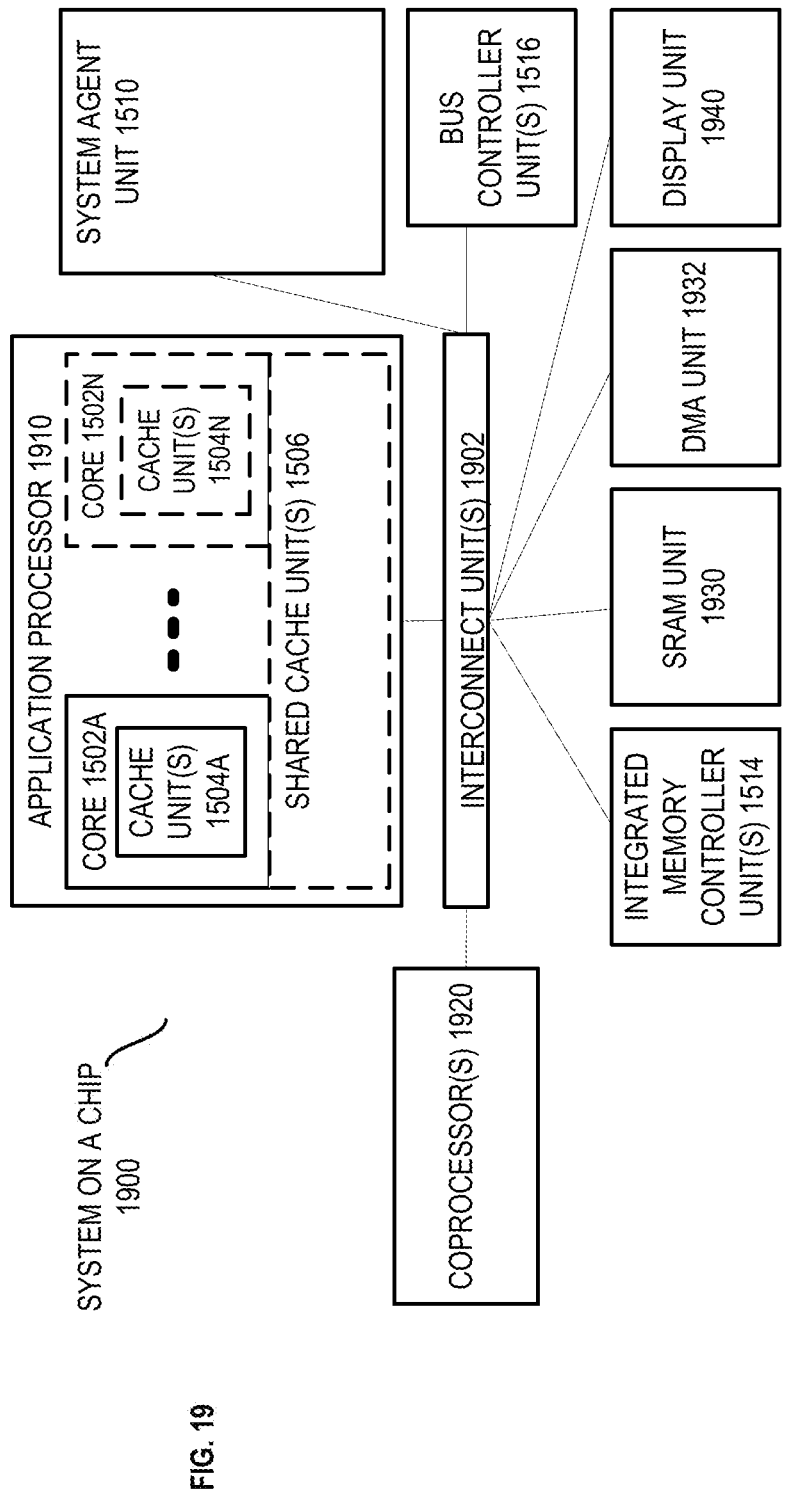
FIG. 19 is a block diagram of a fourth embodiment of a computer architecture.

Referring now to FIG. 19, shown is a block diagram of a SoC 1900 in accordance with an embodiment of the present invention. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 202A-N and shared cache unit(s) 1506; a system agent unit 1510; a bus controller unit(s) 1516; an integrated memory controller unit(s) 1514; a set or one or more coprocessors 1920 which may include integrated graphics logic, an image processor, an audio processor, and a video processor; an static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes or this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language lo communicate with a processing system. The program code may also be implemented in assembly or machine language, if desired. In fact, the mechanisms described herein are not limited in scope lo any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction convener may be used to convert an instruction from a source instruction set to a target instruction set. For example the instruction convener may translate (e.g., using static binary translation, dynamic binary translation including dynamic compilation), morph, emulate, or otherwise convert an instruction to one or more other instructions to be processed by the core. The instruction convener may be implemented in software, hardware firmware, or a combination thereof. The instruction convener may be on processor, off processor, or pan on and part off processor.

FIG. 20 is a block diagram contrasting the use of a software instruction convener to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core in order to achieve substantially the same result as an Intel processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly. FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2012 is used to convert the x86 binary code 2006 into code that may be natively executed by the processor without an x86 instruction set core 2014. This converted cede is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software firmware hardware, or a combination thereof that, through emulation, simulation or any other process, allows a processor or other electronic device that does not have an x86 instruction set processor or core to execute the x86 binary code 2006.

Components, features, and details described for any of FIGS. 3-9 may also optionally be used in any of FIGS. 1-2. Moreover, components, features, and details described herein for any of the apparatus described herein may also optionally be used in and/or apply to any of the methods described herein, which in embodiments may be performed by and/or with such apparatus. Any of the processors described herein may be included in any of the computer systems or other systems disclosed herein. The instruction may have any of the various instruction formats disclosed herein.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements arc not in direct contact with each other, but yet still co-operate or interact with each other. For example, an execution unit may be coupled with a register and/or a decode unit through one or more intervening components. In the figures, arrows are used to show connections and couplings.

The term "and/or" may have been used As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above but only by the claims below. In other instances, well-known circuits, structures, devices, and operations have been shown in block diagram form and/or without detail in order to avoid obscuring the understanding of the description. Where considered appropriate reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may store or otherwise provide one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, servers, network devices (e.g., routers and switches.). Mobile Internet devices (MIDs), media players, smart televisions, nettops, set-top boxes, and video game controllers.

Reference throughout this specification to "one embodiment," "an embodiment," "one or more embodiments," "some embodiments," for example indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifies in the examples may be used anywhere in one or more embodiments.

Example 1 includes a processor comprising a decode unit to decode an instruction. The instruction is to indicate a first source packed data operand that is to include at least four data elements, to indicate a source mask that is to include at least four mask elements, and to indicate a destination storage location. An execution unit is coupled with the decode unit. The execution unit, in response to the instruction, is to store a result packed data operand in the destination storage location. The result packed data operand is to have a series of at least two unmasked result data elements. Each of the unmasked result data elements is to store a value of a different one of at least two consecutive data elements of the first source packed data operand in a relative order. All masked result data elements, which are between a nearest corresponding pair of unmasked result data elements, are to have a same value as an unmasked result data element of the corresponding pair, which is closest to a first end of the result packed data operand. The masked result data elements are to correspond to masked mask elements of the source mask.

Example 2 includes the processor of example 1, wherein the execution unit is to store the result packed data operand that is to include a first set of at least one masked result data element between the first end and a first unmasked result data element of the series that is closest to the first end.

Example 3 includes the processor of example 2, wherein the execution unit is to store the result packed data operand in which each masked result data element of the first set is to have a same value as initially in the destination storage location prior to the result packed data operand being stored.

Example 4 includes the processor of example 2, wherein the decode unit is to decode the instruction that is to indicate a second source packed data operand that is to include a highest order data element, and wherein the execution unit is to store the result packed data operand in which each masked result data element of the first set is to have a same value as the highest order data element of the second source packed data operand.

Example 5 includes the processor of example 2, wherein the decode unit is to decode the instruction that is to indicate a second source packed data operand that is to include a lowest order data element, and wherein the execution unit is to store the result packed data operand in which each masked result data element of the first set is to have a same value as the lowest order data element of the second source packed data operand.

Example 6 includes the processor of examples 1, wherein the execution unit is to store the result packed data operand that is to include a second set of at least one masked result data element between a second end of the result packed data operand and a second unmasked result data dement of the series which is closest to the second end, and each masked result data element of the second set is to have a same value as the second unmasked result data element.

Example 7 includes the processor of examples 1, wherein the execution unit is to store the result packed data operand in which the first end is to comprise a lowest order end, and in which the consecutive data elements arc lowest order consecutive data elements.

Example 8 includes the processor of examples 1, wherein the execution unit is to store the result packed data operand in which the first end is to comprise a lowest order end, in which the consecutive data elements are highest order consecutive data elements.

Example 9 includes the processor of examples 1, wherein the execution unit is to store the result packed data operand in which the first end is to comprise a highest order end, and in which the consecutive data elements are lowest order consecutive data elements.

Example 10 includes the processor of examples 1, wherein the execution unit is to store the result packed data operand in which the first end is to comprise a highest order end, in which the consecutive data elements are highest order consecutive data elements.

Example 11 includes the processor of any one of examples 1 to 10, wherein the source mask is to be stored in a mask register, and wherein the instruction is included in an instruction set with a plurality of other instructions that are to indicate the mask register as a predicate operand.

Example 12 includes the processor of any one of examples 1 to 10, wherein the decode unit is to decode the instruction that is to indicate the first source packed data operand in a location in a memory.

Example 13 includes the processor of any one of examples 1 to 10, wherein the execution unit is to store the result packed data operand in which a characteristic that said all masked result data elements, which are between the nearest corresponding pair of unmasked result data elements, are to have the same value as the unmasked result data element of the corresponding pair, which is closest to the first end, is to be implicit to an opcode of the instruction.

Example 14 is a method in a processor comprising receiving an instruction. The instruction indicating a first source packed data operand including at least four data elements, indicating a source mask including at least four mask elements, and indicating a destination storage location. Storing a result packed data operand in the destination storage location in response to the instruction. The result pecked data operand including a series of at least two unmasked result data elements. Each of the unmasked result data elements storing a value of a different one of at least two consecutive data elements of the first source packed data operand in a relative order. All masked result data elements, which arc between a nearest corresponding pair of unmasked result data elements, having a same value as an unmasked result data element of the corresponding pair, which is closest to a first end of the result packed data operand. The masked result data elements corresponding to masked mask elements of the source mask.

Example 15 includes the method of Example 14, wherein storing comprises storing the result packed data operand including a first set of at least two masked result data elements between the first end and a first unmasked result data element of the series that is closest to the first end. Also, in which storing the result packed data operand comprises not changing values of each of the masked result data elements of the first set.

Example 16 includes the method of Example 14, wherein storing comprises storing the result packed data operand including a first set of at least two masked result data elements between the first end and a first unmasked result data element of the series that is closest to the first end. Also, in which each of the masked result data elements of the first set is to have a same value as a highest order data element of a second source packed data operand indicated by the instruction.

Example 17 includes the method of Example 16, wherein the first end comprises a lowest order end.

Example 18 includes the method of Example 16, wherein storing comprises storing the result packed data operand including a second set of at least one masked result data element between a second end of the result packed data operand and a second unmasked result data element of the series which is closest to the second end. Also, in which each masked result data element of the second set is to have a same value as the second unmasked result data element.

Example 19 includes the method of Example 14, wherein storing comprises storing the result packed data operand including a first set of at least two masked result data elements between the first end and a first unmasked result data element of the series that is closest to the first end Also, in which each of the masked result data elements of the first set is to have a same value as a lowest order data element of a second source packed data operand indicated by the instruction.

Example 20 includes the method of Example 19, wherein the first end comprises a highest order end.

Example 21 includes the method of Example 14, wherein storing comprises storing the result packed data in which there are at least three masked result data elements between a given nearest pair of unmasked result data elements.

Example 22 is a system to process instructions comprising an interconnect, and a processor coupled with the interconnect. The processor operable, in response to an instruction that is to indicate a first source packed data operand that is to include at least Tour data elements, to indicate a source mask that is to include at least four mask elements, and to indicate a destination storage location, to store a result packed data operand in the destination storage location. The result packed data operand lo include a series of at least two unmasked result data elements. Each of the unmasked result data elements to store a value of a different one of at least two consecutive data elements of the first source packed data operand in a relative order, All masked result data elements, which arc between a nearest corresponding pair of unmasked result data elements, to have a same value as an unmasked result data element of the corresponding pair, which is closest to a first end of the result packed data operand. The masked result data elements to correspond to masked mask elements of the source mask. The system also includes a dynamic random access memory (DRAM) coupled with the interconnect. The DRAM storing a set of instructions to vectorize a loop that performs computations on a scalar value that is incremented based on a plurality of conditions. The set of instructions, when executed by the processor, operable to cause the processor to perform operations comprising evaluating the plurality of conditions, making elements of the source mask be unmasked for conditions evaluated to be true, making elements of the source mask be masked for conditions evaluated to be false, and performing the computations on the result packed data operand in parallel.

Example 23 includes the system of Example 22, wherein the processor is to store the result packed data operand that is lo include a first set of at least two masked result data elements between the first end and a first unmasked result data element of the series that is closest to the first end. Each of the masked result data elements of the first set to have a same value as a highest order data element of a second source packed data operand lo be indicated by the instruction.

Example 24 includes an article of manufacture comprising a non-transitory machine-readable storage medium. The non-transitory machine-readable storage medium storing an instruction. The instruction to indicate a first source packed data operand that is to include at least four data elements, lo indicate a source mask that is to include at least four mask elements, and lo indicate a destination storage location. The instruction if executed by a machine is operable to cause the machine to perform operations comprising storing a result packed data operand in the destination storage location. The result packed data operand to include a series of at least two unmasked result dam elements. Each of the unmasked result data elements to store a value of a different one of at least two consecutive data elements of the first source packed data operand in a relative order. All masked result data elements, which are between a nearest corresponding pair of unmasked result data elements, to have a same value as an unmasked result data element of the corresponding pair, which is closest to a first end of the result packed data operand. The masked result data elements to correspond to masked mask elements of the source mask.

Example 25 includes the article of manufacture of Example 24, wherein the result packed data operand is to include at least three masked result data elements between a corresponding nearest pair of unmasked result data elements. Optionally, each mask element may consist of a single bit.

Example 26 includes a processor or other apparatus that is operable to perform the method of any of Examples 14-21.

Example 27 includes a processor or other apparatus that includes means for performing the method of any of Examples 14-21.

Example 28 includes a processor that includes modules, units, logic, circuitry, means, or any combination thereof, to perform the method of any of Examples 14-21.

Example 29 includes an optionally non-transitory machine-readable medium that optionally stores or otherwise provides an instruction that if and/or when executed by a processor, computer system, or other machine is operable to cause the machine to perform the method of any of Examples 14-21.

Example 30 includes a processor or other apparatus that is operable to perform one or more operations or any method substantially as described herein.

Example 31 includes a processor or other apparatus including means for performing one or more operations or any method substantially as described herein.

Example 32 includes a processor or other apparatus that is operable to perform any of the instructions substantially as described herein.

Example 33 includes a processor or other apparatus including means for performing any of the instructions substantially as described herein.

Example 34 includes a processor or other apparatus including a decode unit that is operable to decode instructions of a first instruction set. The decode unit is to receive one or more instructions that emulate a first instruction, which may be any of the instructions substantially as disclosed herein, and which is to be of a second instruction set. The processor or other apparatus also includes one or more execution units coupled with the decode unit to execute the one or more instructions of the first instruction set. The one or more execution units in response to the one or more instructions of the first instruction set are operable to store a result in a destination. The result may include any of the results substantially as disclosed herein for the first instruction.

Example 35 includes a computer system or other electronic device that includes a processor having a decode unit that is operable to decode instructions of a first instruction set, and having one or more execution units. The computer system also includes a storage device coupled to the processor. The storage device is to store a first instruction, which may be any of the instructions substantially as disclosed herein, and which is to be of a second instruction set. The storage device is also to store instructions to convert the first instruction into one or more instructions of the first instruction set. The one or more instructions of the first instruction set, when executed by the processor, are operable to cause the processor to store a result in a destination. The result may include any of the results substantially as disclosed herein for the first instruction.

What is claimed is:

1. A processor comprising:
   a decode unit to decode an instruction, the instruction to indicate a first source packed data operand that is to include at least four data elements, to indicate a source mask that is to include at least four mask elements, and to indicate a destination storage location;
   an execution unit coupled with the decode unit, the execution unit, in response to the instruction, to store a result packed data operand in the destination storage location, the result packed data operand to have:
   a series of at least two unmasked result data elements, each of the unmasked result data elements to store a value of a different one of at least two consecutive data elements of the first source packed data operand in a relative order; and
   all masked result data elements, which are between a nearest corresponding pair of unmasked result data elements, to have a same value as an unmasked result data element of the corresponding pair, which is closest to a first end of the result packed data operand, the masked result data elements to correspond to masked mask elements of the source mask.

2. The processor of claim 1, wherein the execution unit is to store the result packed data operand that is to include a first set of at least one masked result data element between the first end and a first unmasked result data element of the series that is closest to the first end.

3. The processor of claim 2, wherein the execution unit is to store the result packed data operand in which each masked result data element of the first set is to have a same value as initially in the destination storage location prior to the result packed data operand being stored.

4. The processor of claim 2, wherein the decode unit is to decode the instruction that is to indicate a second source packed data operand that is to include a highest order data element, and wherein the execution unit is to store the result packed data operand in which each masked result data element of the first set is to have a same value as the highest order data element of the second source packed data operand.

5. The processor of claim 2, wherein the decode unit is to decode the instruction that is to indicate a second source packed data operand that is to include a lowest order data element, and wherein the execution unit is to store the result packed data operand in which each masked result data element of the first set is to have a same value as the lowest order data element of the second source packed data operand.

6. The processor of claim 1, wherein the execution unit is to store the result packed data operand that is to include a second set of at least one masked result data element between a second end of the result packed data operand and a second unmasked result data element of the series which is closest to the second end, and each masked result data element of the second set is to have a same value as the second unmasked result data element.

7. The processor of claim 1, wherein the execution unit is to store the result packed data operand in which the first end is to comprise a lowest order end, and in which the consecutive data elements are lowest order consecutive data elements.

8. The processor of claim 1, wherein the execution unit is to store the result packed data operand in which the first end is to comprise a lowest order end, in which the consecutive data elements are highest order consecutive data elements.

9. The processor of claim 1, wherein the execution unit is to store the result packed data operand in which the first end is to comprise a highest order end, and in which the consecutive data elements are lowest order consecutive data elements.

10. The processor of claim 1, wherein the execution unit is to store the result packed data operand in which the first end is to comprise a highest order end, in which the consecutive data elements are highest order consecutive data elements.

11. The processor of claim 1, wherein the source mask is to be stored in a mask register, and wherein the instruction is included in an instruction set with a plurality of other instructions that are to indicate the mask register as a predicate operand.

12. The processor of claim 1, wherein the decode unit is to decode the instruction that is to indicate the first source packed data operand in a location in a memory.

13. The processor of claim 1, wherein the execution unit is to store the result packed data operand in which a characteristic that said all masked result data elements, which are between the nearest corresponding pair of unmasked result data elements, are to have the same value as the unmasked result data element of the corresponding pair, which is closest to the first end, is to be implicit to an opcode of the instruction.

14. A method in a processor comprising:
receiving an instruction, the instruction indicating a first source packed data operand including at least four data elements, indicating a source mask including at least four mask elements, and indicating a destination storage location; and
storing a result packed data operand in the destination storage location in response to the instruction, the result packed data operand including:
a series of at least two unmasked result data elements, each of the unmasked result data elements storing a value of a different one of at least two consecutive data elements of the first source packed data operand in a relative order; and
all masked result data elements, which are between a nearest corresponding pair of unmasked result data elements, having a same value as an unmasked result data element of the corresponding pair, which is closest to a first end of the result packed data operand, the masked result data elements corresponding to masked mask elements of the source mask.

15. The method of claim 14, wherein storing comprises storing the result packed data operand including a first set of at least two masked result data elements between the first end and a first unmasked result data element of the series that is closest to the first end, and wherein storing the result packed data operand comprises not changing values of each of the masked result data elements of the first set.

16. The method of claim 14, wherein storing comprises storing the result packed data operand including a first set of at least two masked result data elements between the first end and a first unmasked result data element of the series that is closest to the first end, and wherein each of the masked result data elements of the first set is to have a same value as a highest order data element of a second source packed data operand indicated by the instruction.

17. The method of claim 16, wherein the first end comprises a lowest order end.

18. The method of claim 16, wherein storing comprises storing the result packed data operand including a second set of at least one masked result data element between a second end of the result packed data operand and a second unmasked result data element of the series which is closest to the second end, and wherein each masked result data element of the second set is to have a same value as the second unmasked result data element.

19. The method of claim 14, wherein storing comprises storing the result packed data operand including a first set of at least two masked result data elements between the first end and a first unmasked result data element of the series that is closest to the first end, and wherein each of the masked result data elements of the first set is to have a same value as a lowest order data element of a second source packed data operand indicated by the instruction.

20. The method of claim 19, wherein the first end comprises a highest order end.

21. The method of claim 14, wherein storing comprises storing the result packed data operand in which there are at least three masked result data elements between a given nearest pair of unmasked result data elements.

22. A system to process instructions comprising:
an interconnect;
a processor coupled with the interconnect, the processor operable, in response to an instruction that is to indicate a first source packed data operand that is to include at least four data elements, to indicate a source mask that is to include at least four mask elements, and to indicate a destination storage location, to store a result packed data operand in the destination storage location, the result packed data operand to include:
a series of at least two unmasked result data elements, each of the unmasked result data elements to store a value of a different one of at least two consecutive data elements of the first source packed data operand in a relative order; and
all masked result data elements, which are between a nearest corresponding pair of unmasked result data elements, to have a same value as an unmasked result data element of the corresponding pair, which is closest to a first end of the result packed data operand, the masked result data elements to correspond to masked mask elements of the source mask; and
a dynamic random access memory (DRAM) coupled with the interconnect, the DRAM storing a set of instructions to vectorize a loop that performs computations on a scalar value that is incremented based on a plurality of conditions, the set of instructions, when executed by the processor, operable to cause the processor to perform operations comprising:
evaluating the plurality of conditions;
making elements of the source mask be unmasked for conditions evaluated to be true;
making elements of the source mask be masked for conditions evaluated to be false; and
performing the computations on the result packed data operand in parallel.

23. The system of claim 22, wherein the processor is to store the result packed data operand that is to include a first set of at least two masked result data elements between the first end and a first unmasked result data element of the series that is closest to the first end, each of the masked result data elements of the first set to have a same value as a highest order data element of a second source packed data operand to be indicated by the instruction.

24. An article of manufacture comprising a non-transitory machine-readable storage medium, the non-transitory machine-readable storage medium storing an instruction, the instruction to indicate a first source packed data operand that is to include at least four data elements, to indicate a source mask that is to include at least four mask elements, and to indicate a destination storage location, and the instruction if executed by a machine is operable to cause the machine to perform operations comprising:

storing a result packed data operand in the destination storage location, the result packed data operand to include:

a series of at least two unmasked result data elements, each of the unmasked result data elements to store a value of a different one of at least two consecutive data elements of the first source packed data operand in a relative order; and all masked result data elements, which are between a nearest corresponding pair of unmasked result data elements, to have a same value as an unmasked result data element of the corresponding pair, which is closest to a first end of the result packed data operand, the masked result data elements to correspond to masked mask elements of the source mask.

25. The article of manufacture of claim 24, wherein the result packed data operand is to include at least three masked result data elements between a corresponding nearest pair of unmasked result data elements, and wherein each mask element is to consist of a single bit.

* * * * *